(12) United States Patent  
Sakurai

(10) Patent No.: US 11,476,515 B2  
(45) Date of Patent: Oct. 18, 2022

(54) POWER STORAGE MODULE AND POWER STORAGE MODULE PACK

(71) Applicant: HONDA MOTOR CO., LTD., Tokyo (JP)

(72) Inventor: Atsushi Sakurai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 103 days.

(21) Appl. No.: 16/917,989

(22) Filed: Jul. 1, 2020

(65) Prior Publication Data

US 2021/0013562 A1 Jan. 14, 2021

(30) Foreign Application Priority Data

Jul. 10, 2019 (JP) .............................. JP2019-128707

(51) Int. Cl.
*H01M 10/6554* (2014.01)
*H01M 10/613* (2014.01)
(Continued)

(52) U.S. Cl.
CPC .......... *H01M 10/6554* (2015.04); *B60K 1/04* (2013.01); *H01M 10/613* (2015.04); *H01M 10/625* (2015.04); *H01M 10/647* (2015.04); *H01M 10/656* (2015.04); *H01M 50/20* (2021.01); *H01M 50/543* (2021.01)

(58) Field of Classification Search
CPC .......... H01M 10/6554; H01M 10/613; H01M 10/625; H01M 10/647; H01M 10/656; H01M 50/20; H01M 50/543; H01M 10/6551; H01M 10/6556; H01M 50/209; H01M 10/0404; B60K 1/04;
(Continued)

(56) References Cited

U.S. PATENT DOCUMENTS

2012/0018238 A1* 1/2012 Mizoguchi ............ H01M 50/20  
    180/68.5  
2012/0312614 A1* 12/2012 Fujiwara ............... H01M 50/20  
    180/68.5  
(Continued)

FOREIGN PATENT DOCUMENTS

CN      205564850      9/2016  
CN      103000836      12/2016  
(Continued)

OTHER PUBLICATIONS

Japanese Office Action for Japanese Patent Application No. 2019-128707 dated Apr. 19, 2022.
(Continued)

*Primary Examiner* — Kaity V Chandler  
(74) *Attorney, Agent, or Firm* — Amin, Turocy & Watson, LLP

(57) ABSTRACT

A power storage module comprises: a frame body; a plurality of power storage cells accommodated in the frame body; a bridging portion that is provided inside the frame body and connects an upper portion and a lower portion of the frame body to each other; and two flange portions that are provided outside the frame body and project in directions opposite to each other. The two flange portions are located above a central portion of the frame body in a height direction.

10 Claims, 12 Drawing Sheets

(51) Int. Cl.
*H01M 10/625* (2014.01)
*H01M 10/647* (2014.01)
*H01M 10/656* (2014.01)
*B60K 1/04* (2019.01)
*H01M 50/20* (2021.01)
*H01M 50/543* (2021.01)

(58) Field of Classification Search
CPC . B60K 2001/0422; Y02E 60/10; Y02P 70/50; Y02T 10/70; B60L 50/64
See application file for complete search history.

(56) References Cited

U.S. PATENT DOCUMENTS

| | | | | |
|---|---|---|---|---|
| 2013/0071713 | A1 | 3/2013 | Kim | |
| 2013/0164577 | A1* | 6/2013 | Insana | H01M 50/20 429/72 |
| 2015/0093982 | A1* | 4/2015 | Bailey | H01M 50/20 454/184 |
| 2016/0056428 | A1* | 2/2016 | Kim | H01M 50/572 211/59.4 |
| 2016/0240827 | A1* | 8/2016 | Sakurai | H01M 50/502 |
| 2016/0240835 | A1* | 8/2016 | Sakurai | H01M 10/613 |
| 2016/0308180 | A1* | 10/2016 | Kohda | H01M 10/525 |
| 2017/0054307 | A1* | 2/2017 | Kim | H01M 50/502 |
| 2018/0062224 | A1* | 3/2018 | Drabon | H01M 10/6556 |
| 2018/0226704 | A1* | 8/2018 | Shimoike | H01M 10/6565 |
| 2018/0337377 | A1* | 11/2018 | Stephens | B60L 50/66 |
| 2019/0006644 | A1* | 1/2019 | Sakurai | H01M 50/543 |
| 2019/0013500 | A1* | 1/2019 | Sakurai | H01M 50/20 |
| 2019/0013501 | A1* | 1/2019 | Sakurai | B60K 1/04 |
| 2019/0081298 | A1* | 3/2019 | Matecki | B60R 19/023 |
| 2019/0097202 | A1* | 3/2019 | Morone | H01M 50/22 |
| 2019/0109357 | A1* | 4/2019 | Kenney | H01M 10/625 |
| 2019/0115573 | A1* | 4/2019 | Sakurai | B60L 50/64 |
| 2019/0115614 | A1* | 4/2019 | Sakurai | H01M 50/20 |
| 2019/0296288 | A1* | 9/2019 | Sakurai | H01M 10/0587 |
| 2019/0326573 | A1* | 10/2019 | Ozawa | B60K 1/04 |

FOREIGN PATENT DOCUMENTS

| | | | | |
|---|---|---|---|---|
| CN | 206040716 | U * | 3/2017 | Y02P 70/50 |
| CN | 108807727 | | 11/2018 | |
| CN | 111029502 | A * | 4/2020 | H01M 10/613 |
| CN | 111081923 | A * | 4/2020 | H01M 10/0413 |
| EP | 2768045 | A1 * | 8/2014 | B60L 11/1879 |
| FR | 3014635 | A1 * | 6/2015 | H01M 2/1077 |
| FR | 3069564 | B1 * | 8/2019 | E04H 5/04 |
| JP | 09-240288 | | 9/1997 | |
| JP | 2007-305426 | | 11/2007 | |
| JP | 2011-124101 | | 6/2011 | |
| JP | 2012-169171 | | 9/2012 | |
| JP | 2013-012441 | | 1/2013 | |
| JP | 2013-065558 | | 4/2013 | |
| JP | 2013-243079 | | 12/2013 | |
| JP | 2016-122572 | | 7/2016 | |
| JP | 2017-010778 | | 1/2017 | |
| JP | 6254904 | | 12/2017 | |
| JP | 2018-156825 | | 10/2018 | |
| JP | 2018-195816 | | 12/2018 | |
| JP | 2019-009085 | | 1/2019 | |
| JP | 6561672 | B2 * | 8/2019 | B60K 1/04 |
| JP | 2019525397 | A * | 9/2019 | H01M 10/6556 |
| JP | 2020064795 | A * | 4/2020 | H01M 10/0413 |
| JP | 2020-191165 | | 11/2020 | |

OTHER PUBLICATIONS

Chinese Office Action for Chinese Patent Application No. 202010570722.6 dated Jul. 19, 2022.

* cited by examiner

POWER STORAGE MODULE AND POWER STORAGE MODULE PACK

CROSS-REFERENCE TO RELATED APPLICATION

Priority is claimed on Japanese Patent Application No. 2019-128707, filed Jul. 10, 2019, the content of which is incorporated herein by reference.

BACKGROUND OF THE INVENTION

Field of the Invention

The present disclosure relates to a power storage module and a power storage module pack.

Description of Related Art

In the related art, a vehicle such as a hybrid vehicle or an electric vehicle is equipped with a power storage module for supplying electric power to a motor as a power source or for storing electric power regenerated by a motor (a generator).

The power storage module has a plurality of stacked power storage cells. As the power storage cell, a power storage cell in which a battery element including a positive electrode and a negative electrode is accommodated in a metal cell can, or a power storage cell in which a battery element is enclosed in a resin laminated film is known. For example, the power storage cell has a pair of positive and negative electrode terminals outside, and the electrode terminals of adjacent power storage cells are electrically connected in series or in parallel by a bus bar.

In recent years, with an increase in output of hybrid vehicles, electric vehicles, or the like, there has been a trend of increase in size of power storage modules to secure a capacity. However, since space for installation of equipment is limited in a vehicle, if a power storage module is increased in size, the power storage module may not be able to be installed suitably in some cases. Therefore, for example, a power storage module that includes a storage battery group in which a plurality of storage batteries are stacked, end plates which are provided at both ends of the storage battery group in a stacking direction, and a connecting band which connects the end plates to each other has been proposed (Patent Document 1). In this power storage module, a fastening member accommodation portion is located inside the connecting band to be provided directly or adjacent to the end plate, and accommodates a pair of fastening members for fixing the power storage module to an installation site. Further, an attachment portion of the connecting band is fixed to the end plate at a position on a side of a central portion of a plate surface of the end plate with respect to the fastening member accommodation portion. According to this configuration, it is possible to favorably secure an area for a heat sink arranged between the pair of fastening members and to easily reduce the size of the entire equipment.

PATENT DOCUMENTS

[Patent Document 1] Japanese Patent No. 6254904

SUMMARY OF THE INVENTION

In a technique of Patent Document 1, in a case where the vehicle is equipped with the power storage module with the power storage module being accommodated in an outer case, a bolt inserted through the end plate of the power storage module is screwed into a female screw portion of the outer case to fasten the end plate to the outer case. However, since a lower surface of the end plate and the outer case are close to each other, the shape of the outer case is restricted, and it is difficult to secure rigidity of the outer case. In addition, in a case where a reinforcing member is added to improve the rigidity of the outer case, a size of the outer case in a height direction increases, which may reduce on-vehicle installation capability.

Further, in such a structure, the bolt passes through the end plate, and thus it is difficult to align a through-hole of the end plate with the female screw portion of the outer case, and assembling properties of the power storage module and the outer case are poor.

Further, for example, in a case where a lower surface of the vehicle comes into contact with the ground inadvertently, a shock from below the outer case is transmitted to the female screw portion and is directly transmitted to the power storage module via the female screw portion, which may cause a malfunction of the power storage module. Therefore, it is necessary to take structural measures capable of withstanding a shock from below.

An object of the present disclosure is to provide a power storage module and a power storage module pack in which assembling properties can be improved while securing sufficient rigidity and on-vehicle installation capability, and further, in which shock resistance against a shock from below can be improved.

[1] The first aspect of the present disclosure provides a power storage module including: a frame body; a plurality of power storage cells accommodated in the frame body; a bridging portion that is provided inside the frame body and connects an upper portion and a lower portion of the frame body to each other; and two flange portions that are provided outside the frame body and project in directions opposite to each other, wherein the two flange portions are located above a central portion of the frame body in a height direction.

[2] In the first aspect of the present disclosure, the frame body includes a bottom plate portion, a top plate portion, and two side plate portions that connect the bottom plate portion and the top plate portion to each other, and wherein the two flange portions project from the side plate portion in a lateral direction of the frame body, and extend over approximately the entire side plate portion in a length direction.

[3] In the first aspect of the present disclosure, a sheet-shaped temperature control device is attached to at least one of the upper portion and the lower portion of the frame body.

[4] In the first aspect of the present disclosure, a refrigerant inlet/outlet port of the temperature control device is arranged on a side opposite to positive/negative electrode terminals of the plurality of power storage cells.

[5] The second aspect of the present disclosure provides a power storage module pack includes: a plurality of power storage modules; and a box body that accommodates the plurality of power storage modules, wherein the power storage module includes a frame body, a plurality of power storage cells accommodated in the frame body, a bridging portion that is provided inside the frame body and connects an upper portion and a lower portion of the frame body to each other, and two flange portions that are provided outside the frame body and project in directions opposite to each other, wherein the two flange portions are located above a central portion of the frame body in a height direction, wherein the box body includes a bottom wall portion, and a plurality of first longitudinal wall portions that extend from the bottom wall portion and are provided side by side at intervals, and wherein the two flange portions of the frame body are each fixed to upper end portions of two adjacent first longitudinal wall portions.

[6] In the second aspect of the present disclosure, a space portion is provided between the frame body of the power storage module and the bottom wall portion of the box body.

[7] In the second aspect of the present disclosure, a heat insulating member is arranged in the space portion.

[8] In the second aspect of the present disclosure, a sheet-shaped temperature control device is attached to at least one of the upper portion and the lower portion of the frame body of the power storage module.

[9] In the second aspect of the present disclosure, a refrigerant inlet/outlet port of the temperature control device is arranged on a side opposite to electrode terminals of the plurality of power storage cells.

[10] In the second aspect of the present disclosure, the plurality of first longitudinal wall portions include a thick longitudinal wall portion arranged in a central portion of the box body in a plan view, and a thin longitudinal wall portion arranged adjacent to the thick longitudinal wall portion.

[11] In the second aspect of the present disclosure, an upper end portion of the thick longitudinal wall portion has thereon a non-overlapping portion at which the flange portion provided in one of the two adjacent power storage modules and the flange portion provided in the other of the two power storage modules do not overlap, and wherein an upper end portion of the thin longitudinal wall portion has thereon an overlapping portion at which the flange portion provided in one of the two adjacent power storage modules and the flange portion provided in the other of the two power storage modules overlap.

[12] In the second aspect of the present disclosure, the box body further includes at least one second longitudinal wall portion provided perpendicularly to the plurality of first longitudinal wall portions.

[13] In the second aspect of the present disclosure, the power storage module pack further includes a lid body detachably provided to cover an upper portion of the box body.

According to the present disclosure, it is possible to improve assembling properties while securing sufficient rigidity and on-vehicle installation capability, and further, to improve shock resistance against a shock from below.

DETAILED DESCRIPTION OF THE INVENTION

Hereinafter, embodiments of the present disclosure will be described in detail with reference to the drawings.

Figure 1:
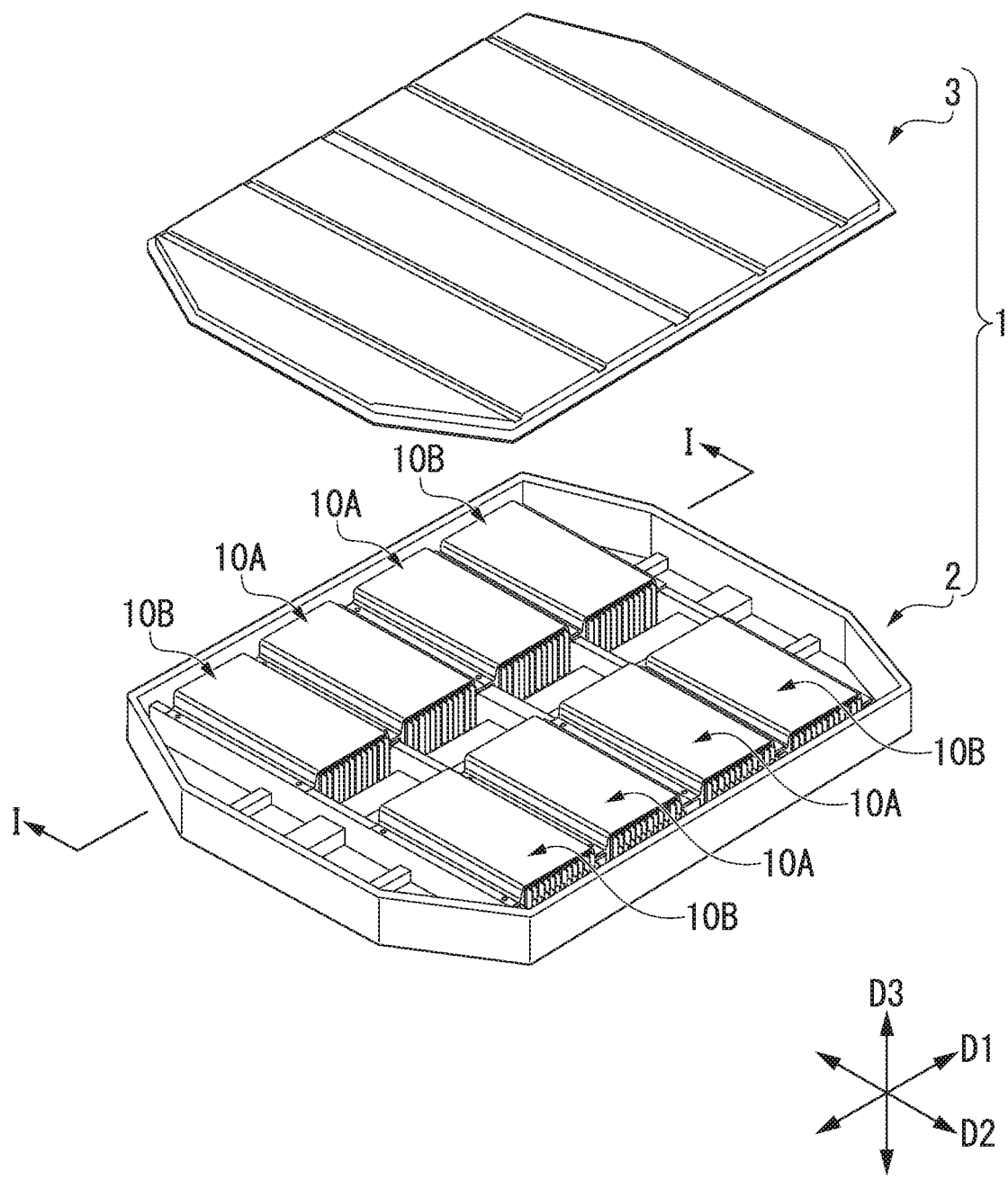
FIG. 1 is a perspective view schematically showing an overall configuration of a power storage module pack according to an embodiment of the present disclosure.

FIG. 1 is a perspective view schematically showing an overall configuration of a power storage module pack according to an embodiment of the present disclosure. Note that in the drawings used in the following description, to make characteristics easy to understand, characteristic portions may be enlarged for convenience in some cases, and shapes, dimensional ratios, and the like of each component are not limited to those illustrated.

In each drawing, a D1 direction indicates a length direction of a power storage module pack 1. A D2 direction indicates a width direction of the power storage module pack 1. A D3 direction indicates a height direction of the power storage module pack 1. A direction that a D3 direction indicates is a vertical direction, for example.

As shown in FIG. 1, the power storage module pack 1 includes a plurality of power storage modules 10A and 10B, a box body 2 that accommodates the plurality of power storage modules 10A and 10B, and a lid body 3 detachably provided to cover an upper portion of the box body 2. The power storage module pack 1 is a low-profile case, and is placed between a floor panel and a front seat of a vehicle, for example.

The box body 2 has a polygonal shape in a plan view, and has an octagonal shape in a plan view in the present embodiment. The box body 2 is formed of a material such as metal or resin, and is formed of a steel plate, for example. In the box body 2, the plurality of power storage modules 10A, 10B are arranged in a matrix shape, and in the present embodiment, eight power storage modules are arranged in 2 rows and 4 columns.

Like the box body, the lid body 3 has a polygonal shape in a plan view, and has an octagonal shape in a plan view in the present embodiment. The lid body 3 is formed of a material such as metal or resin, and is formed of glass fiber reinforced plastic (GFRP), for example. The lid body 3 may be formed of the same material as the box body 2, or may be formed of a different material. In addition, the lid body 3 may be detachably provided to the box body 2, and may be provided separately from or may be provided integrally with the box body 2. By mounting the lid body 3 on the box body 2, it is possible to maintain an internal space of the box body 2 in a sealed state.

Figure 2A:
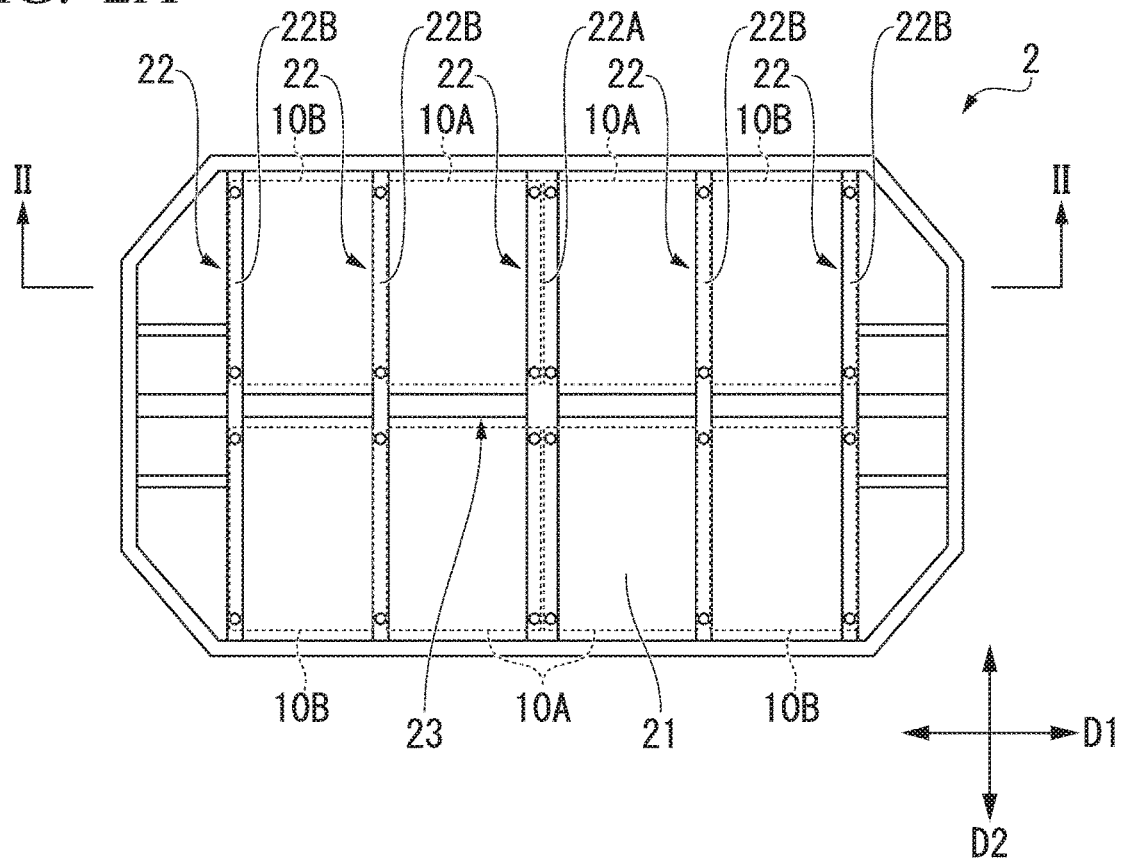
FIG. 2A is a plan view schematically showing a configuration of a box body in FIG. 1.
Figure 2B:
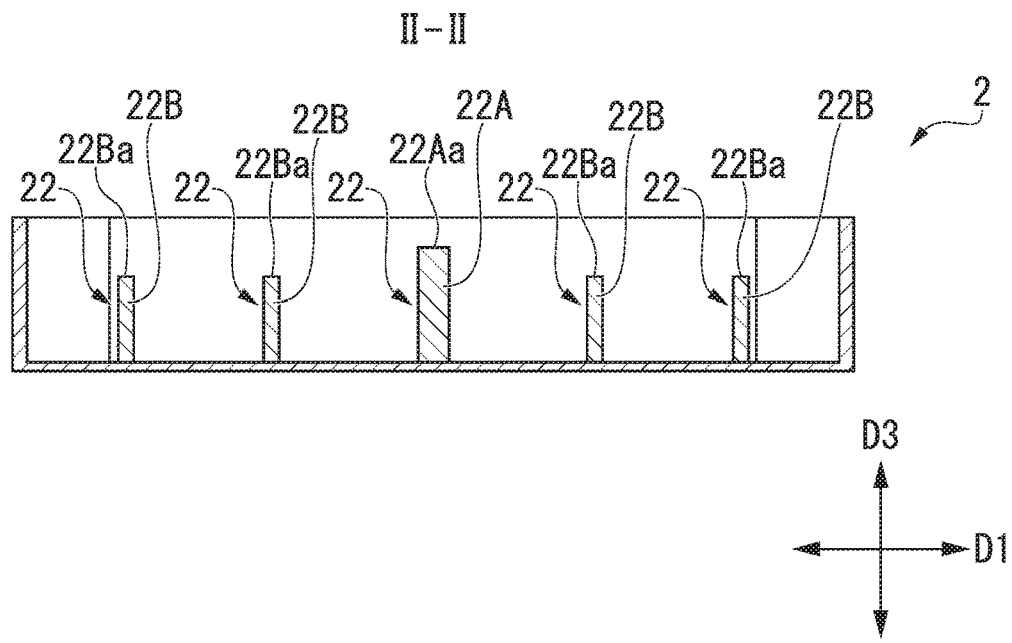
FIG. 2B is a cross-sectional view of the box body along line II-II in FIG. 2A.

FIG. 2A is a plan view schematically showing a configuration of the box body 2 in FIG. 1, and FIG. 2B is a cross-sectional view of the box body 2 along line II-II in FIG. 2A.

As shown in FIGS. 2A and 2B, the box body 2 includes a bottom wall portion 21, a plurality of first longitudinal wall portions 22 that extend from the bottom wall portion 21 and are provided side by side at intervals, and a second longitudinal wall portion 23 provided perpendicularly to the plurality of first longitudinal wall portions 22. The plurality of first longitudinal wall portions 22 and the second longitudinal wall portion 23 have a frame structure constituted by a main frame and a cross member, whereby rigidity of the box body 2 in a length direction and a width direction (a D1 direction and a D2 direction) is improved. Further, in the cross-sectional view of the box body 2, since the first longitudinal wall portion 22 and the second longitudinal wall portion 23 extend in a height direction of the box body 2 (a D3 direction), rigidity of the box body 2 in a height direction (a D3 direction) is improved.

Further, the first longitudinal wall portion 22 of the present embodiment is arranged between adjacent power storage modules 10A and 10A (or between the power storage modules 10A and 10B), and the second longitudinal wall portion 23 is also arranged between adjacent power storage modules 10A and 10B. In this way, since the first longitudinal wall portion 22 and the second longitudinal wall portion 23 are arranged between two adjacent power storage modules, a space efficiency of the box body 2 becomes favorable.

The plurality of first longitudinal wall portions 22 include a thick longitudinal wall portion 22A arranged in a central portion of the box body 2 in a plan view, and a thin longitudinal wall portion 22B arranged adjacent to the thick longitudinal wall portion 22A. Further, in the present embodiment, a size of the thick longitudinal wall portion 22A in a height direction (a D3 direction) is larger than a size of the thin longitudinal wall portion 22B in a height direction (a D3 direction).

For example, the thick longitudinal wall portion 22A is integrally formed with the bottom wall portion 21 and has an upper end portion 22Aa on a side opposite to the bottom wall portion 21. A flange portion, which will be described later, provided on the plurality of power storage modules 10A and 10A is placed on the upper end portion 22Aa. Further, a plurality of tap holes are formed in the upper end portion 22Aa of the thick longitudinal wall portion 22A, and the plurality of power storage modules 10A and 10A are fixed to the thick longitudinal wall portion 22A by fastening members such as bolts.

For example, the thin longitudinal wall portion 22B is integrally formed with the bottom wall portion 21 and has an upper end portion 22B a on a side opposite to the bottom wall portion 21. A flange portion, which will be described later, provided on the plurality of power storage modules 10A and 10B is placed on the upper end portion 22B a. Further, a plurality of tap holes are formed in the upper end portion 22Ba of the thin longitudinal wall portion 22B, and the plurality of power storage modules 10A and 10B are fixed to the thin longitudinal wall portion 22B by fastening members such as bolts.

In the present embodiment, although the plurality of first longitudinal wall portions 22 include the thick longitudinal wall portions 22A and the thin longitudinal wall portions 22B having different thicknesses, the present disclosure is not limited thereto, and for example, the plurality of first longitudinal wall portions may be configured to have the same thickness. Further, the size of the thick longitudinal wall portion 22A in a height direction (a D3 direction) is larger than the size of the thin longitudinal wall portion 22B in a height direction, but the present disclosure is not limited to this, for example, the size of the thick longitudinal wall portion 22A in a height direction (a D3 direction) may be the same as the size of the thin longitudinal wall portion 22B in a height direction.

Figure 3:
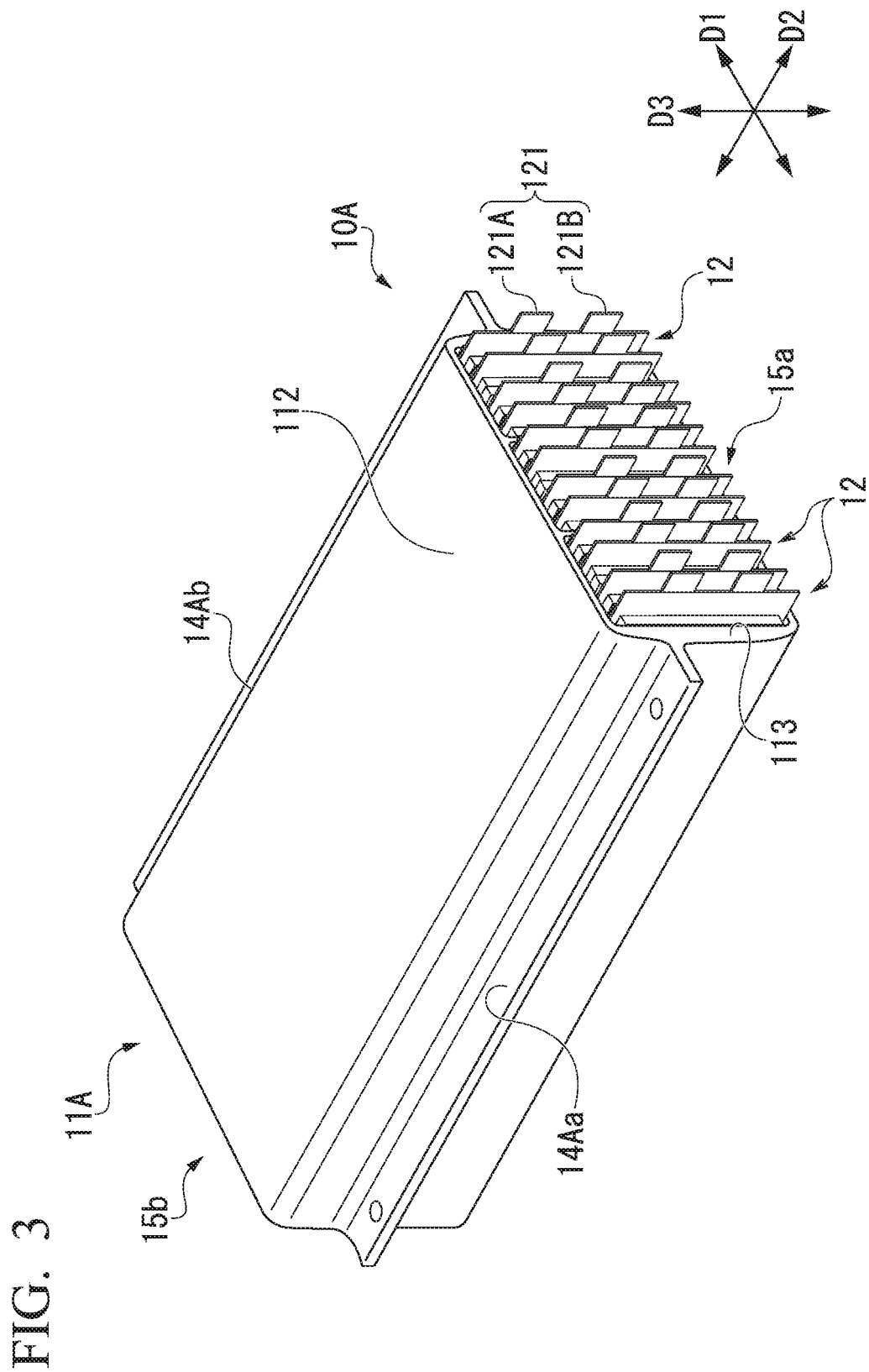
FIG. 3 is a perspective view showing a configuration of a power storage module in FIG. 1.
Figure 4:
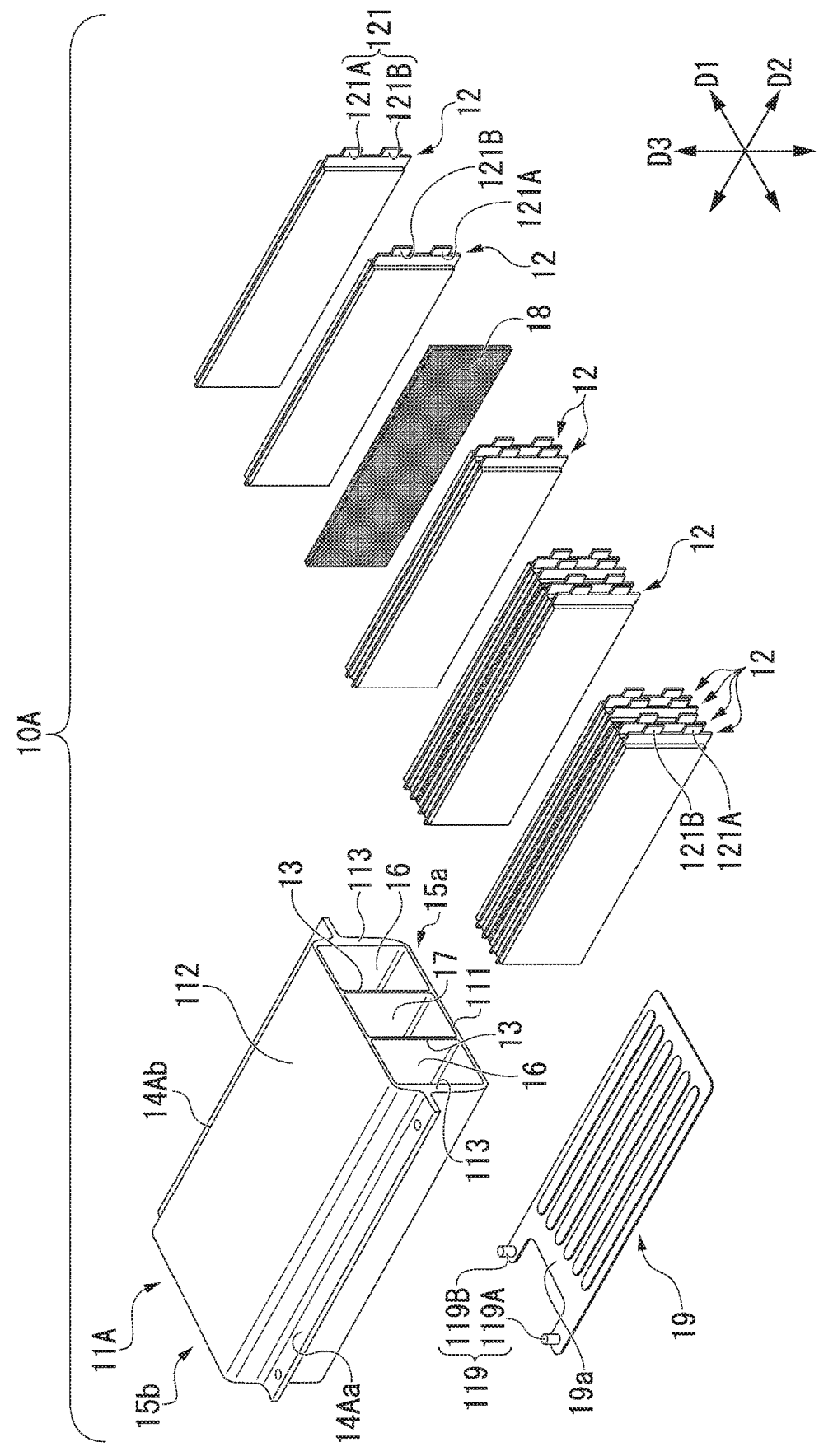
FIG. 4 is an exploded perspective view of the power storage module of FIG. 3.
Figure 5A:
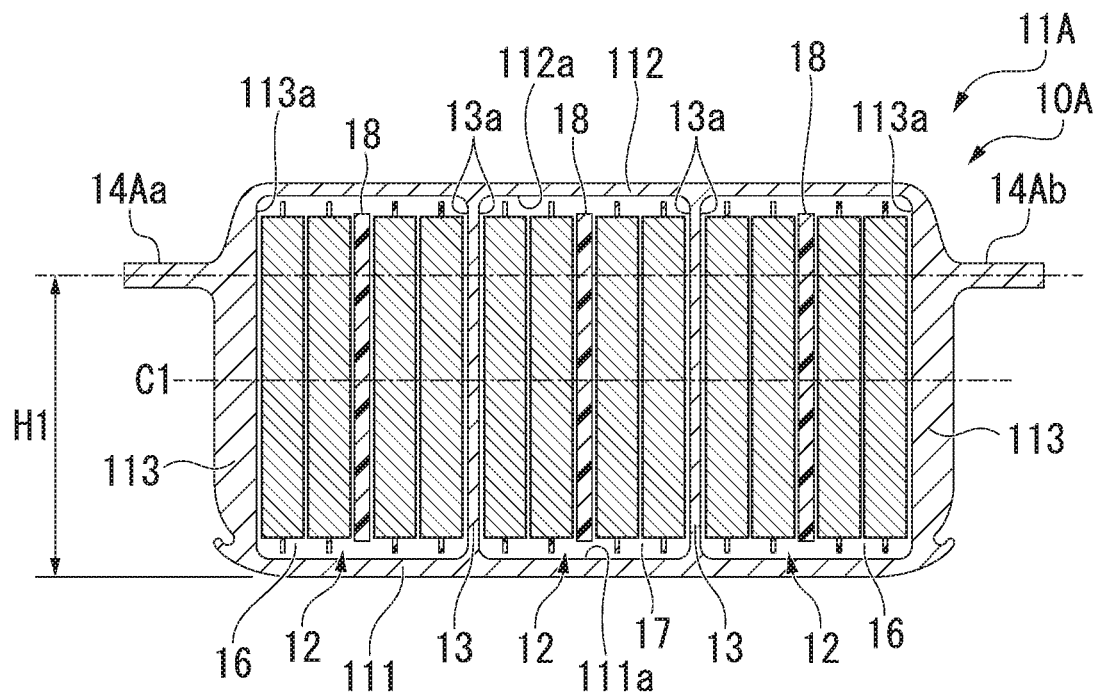
FIG. 5A is a cross-sectional view showing a configuration of one power storage module of FIG. 1.
Figure 5B:
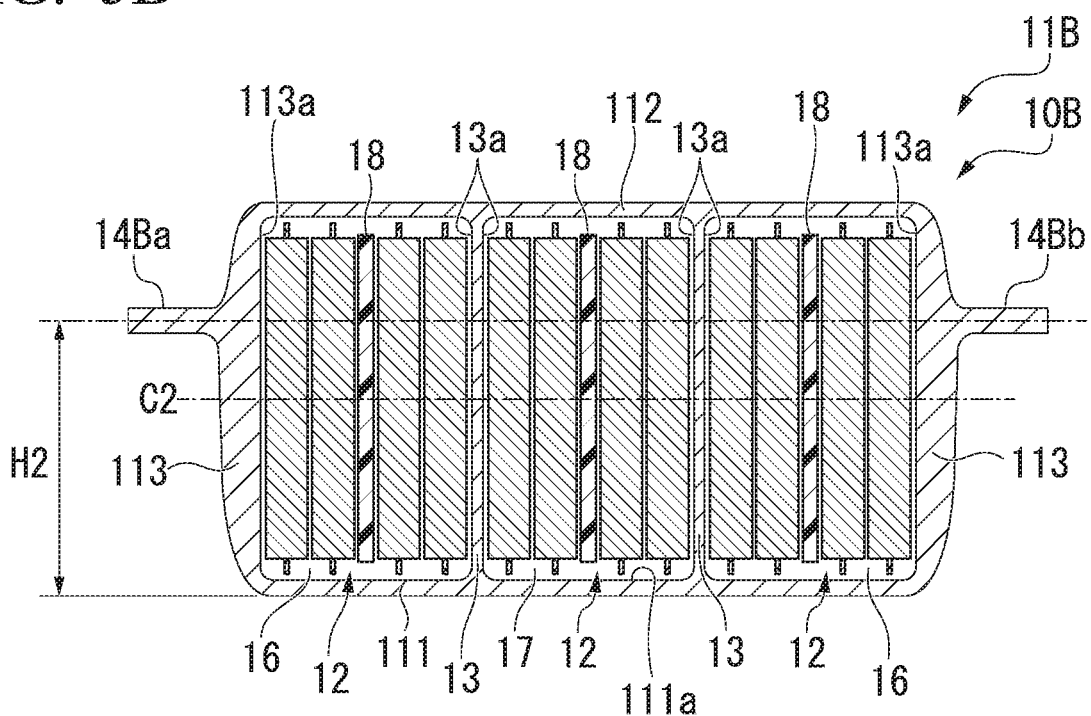
FIG. 5B is a cross-sectional view showing a configuration of another power storage module of FIG. 1.

FIG. 3 is a perspective view showing a configuration of the power storage module 10A in FIG. 1, and FIG. 4 is an exploded perspective view of the power storage module 10A of FIG. 3. FIG. 5A is a cross-sectional view showing a configuration of the power storage module 10A of FIG. 1, and FIG. 5B is a cross-sectional view showing a configuration of the power storage module 10B of FIG. 1.

In each drawing, a D1 direction indicates a width direction of the power storage module 10A. A D2 direction indicates a length direction of the power storage module 10A. A D3 direction indicates a height direction of the power storage module 10A. A direction that a D3 direction indicates is a vertical direction, for example.

As shown in FIGS. 3 and 4, the power storage module 10A includes a frame body 11A, a plurality of power storage cells 12 accommodated in the frame body 11A, two bridging portions 13 and 13 that are provided inside the frame body 11A and connect an upper portion and a lower portion of the frame body 11A to each other, and two flange portions 14Aa and 14Ab that are provided outside the frame body 11A and project in directions opposite to each other.

The frame body 11A includes a bottom plate portion 111, a top plate portion 112, and two side plate portions 113 and 113 that connect the bottom plate portion 111 and the top plate portion 112 to each other. Further, the frame body 11A has openings 15a and 15b provided at both ends in a length direction (a D2 direction) thereof. In the present embodiment, the frame body 11A has a substantially rectangular shape in a side view in a length direction, the bottom plate portion 111 and the top plate portion 112 are arranged parallel to each other, and the two side plate portions 113 and 113 are arranged parallel to each other and are arranged perpendicularly to each of the bottom plate portion 111 and the top plate portion 112.

As shown in FIG. 5A, the two bridging portions 13 and 13 are arranged at equal intervals between the two side plate portions 113 and 113 and are integrally provided between a wall surface 111a on an inner side of the bottom plate portion 111 and a wall surface 112a on an inner side of the top plate portion 112. Wall surfaces 13a of both the bridging portions 13 are parallel to each other. Further, the wall surface 13a of the bridging portion 13 and a wall surface 113a on an inner side of the side plate portion 113 are parallel to each other. Accordingly, inside the frame body 11A, between the parallel wall surfaces 13a, 13a of the two adjacent bridging portions 13 and 13, and between the wall surface 113a on an inner side of the side plate portion 113 and the wall surface 13a of the bridging portion 13, cell storage spaces 16 and 17 each capable of storing a plurality of power storage cells 12 are separately defined. In this way, since the two bridging portions 13 and 13 connect the upper portion and the lower portion of the frame body 11A to each other, rigidity of the frame body 11A in a height direction (a D3 direction) is improved. Therefore, even in a case where the power storage module 10A receives a shock from below, shock transmission to the power storage cells 12 in the frame body 11A can be inhibited, and shock resistance against a shock from below the frame body 11A can be improved.

Further, the two bridging portions 13 and 13 constitute partition plates that partition an internal space of the frame body 11A in a width direction (a D1 direction) of the frame body 11A. Therefore, for example, in a case where a collision load F is input to the power storage module 10A with which a vehicle (not shown) is equipped in an arrangement direction (a D1 direction) of the power storage cells 12, the collision load F causes all the power storage cells 12 in the frame body 11A to move in an input direction (a D1 direction) of the collision load F. At this time, the movement of each power storage cell in the frame body 11A is limited by the two bridging portions 13 and 13, so that the maximum movement amount of the power storage cell 12 (the movement amount of the power storage cell arranged on an input side of the collision load F) is significantly reduced as compared with a case where the two bridging portions 13 and 13 are not provided in the frame body 11A. As a result, when acceleration due to the collision load F is input, a load that is applied to an electrical connection portion between the power storage cells 12 and 12 or an electrical connection portion between the power storage cell 12 and the outside is reduced, and reliability in electrical connection of the power storage cells 12 can be improved.

Further, although the power storage module 10A according to the present embodiment has two bridging portions 13 and 13, the present disclosure is not limited thereto, and the power storage module may have one bridging portion 13 or may have three or more bridging portions 13, 13 . . . .

The frame body 11A of the present embodiment has three cell storage spaces 16, 17, and 16 that are separately defined by the two bridging portions 13. The three cell storage spaces 16, 17, and 16 are linearly arranged in an arrangement direction (a D1 direction) of the wall surface 13a of the bridging portion 13 and the wall surface 113a of the side plate portion 113. Further, the bridging portion 13 extends over the entire length of the frame body 11A in a D2 direction. Therefore, the openings 15a and 15b on both sides of the frame body 11A are also openings on both sides of the cell storage space 16 (or the cell storage space 17).

For example, the frame body 11A has the same shape in a length direction (a D2 direction) thereof, and can be an integrally molded product obtained by impact-molding or extrusion-molding in a D2 direction. For example, the bottom plate portion 111, the top plate portion 112, the two side plate portions 113 and 113, and the two bridging portions 13 and 13 that form the frame body 11A are all formed of a metal material having excellent heat conductivity such as aluminum or aluminum alloy. Accordingly, strength and heat transfer performance of the frame body 11A can be improved. Further, since it is not necessary to assemble components that have been separately formed, the number of components can be reduced and the cost can be reduced.

As shown in FIG. 5A, the two flange portions 14Aa and 14Ab are located above a central portion of the frame body 11A in a height direction (a D3 direction). The two flange portions 14Aa and 14Ab of the present embodiment are provided at a position H1 above a centerline C1 of the frame body 11A in a height direction. Therefore, when the two flange portions 14Aa and 14Ab are each placed on the two first longitudinal wall portions 22, most of the frame body 11A is accommodated inside the box body 2. Further, the two flange portions 14Aa and 14Ab of the present embodiment project from the side plate portion 113 in a width direction (a D1 direction) of the frame body 11A, and extend over approximately the entire side plate portion 113 in a length direction (a D2 direction). Here, "approximately the entire" includes not only a state in which the flange portions 14Aa and 14Ab extend over the entire side plate portion 113 in a length direction (a D2 direction), but also a state in which a part of the flange portions 14Aa and 14Ab is omitted by machining such as cutting, for example, and the flange portions 14Aa and 14Ab extend over substantially the entire side plate portion 113 in a length direction (a D2 direction).

As shown in FIG. 5B, the power storage module 10B includes a frame body 11B, a plurality of power storage cells 12 accommodated in the frame body 11B, two bridging portions 13 and 13 that are provided inside the frame body 11B and connect an upper portion and a lower portion of the frame body 11B to each other, and two flange portions 14Aa and 14Ab that are provided outside the frame body 11B and project in directions opposite to each other. The configuration of the power storage module 10B is the same as the configuration of the power storage module 10A, except that a position in a height direction at which the two flange portions 14Ba and 14Bb are provided is different.

The two flange portions 14Ba and 14Bb are located above a central portion of the frame body 11B in a height direction (a D3 direction). The two flange portions 14Ba and 14Bb of the present embodiment are provided at a position H2 above a centerline C2 of the frame body 11B in a height direction. The position H2 at which the two flange portions 14Ba and 14Bb are provided is lower than H1 at which the two flange portions 14Aa and 14Ab are provided (H2<H1). Accordingly, in a state in which the flange portion 14Ab of the power storage module 10A overlaps the flange portion 14Ba of the power storage module 10B, a position of the top plate portion 112 of the power storage module 10A in a height direction can be set to be the same as a position of the top plate portion 112 of the power storage module 10B in a height direction.

Further, since the power storage module 10B is arranged on a side outward from the power storage modules 10A in a length direction (a D1 direction) of the power storage module pack 1 (FIG. 2), a temperature difference between the power storage modules 10A and 10B may occur during vibration. Therefore, a shape (for example, a contour shape) of the frame body 11B of the power storage module 10B may be different from a shape of the frame body 11A of the power storage module 10A so that heat dissipation of the frame body 11A is higher than that of the frame body 11B. Accordingly, the temperature difference between the power storage modules 10A and 10B is reduced, and uniform heat distribution can be achieved.

The power storage cell 12 accommodates a battery element (not shown) having a positive electrode plate and a negative electrode plate therein. As shown in FIG. 4, the power storage cell 12 has a laterally long rectangular shape that is flat in a D1 direction, has a height slightly lower than a height of each of the cell storage spaces 16 and 17, and has a width slightly wider than a width of each of the cell storage spaces 16 and 17. At one end 12a of the power storage cell 12 in a length direction (a D2 direction), a positive electrode terminal 121A electrically connected to the positive electrode plate of the battery element projects, and negative electrode terminal 121B electrically connected to the negative electrode plate of the battery element projects. The positive electrode terminal 121A and the negative electrode terminal 121B constitute an electrode terminal 121 of the power storage cell 12.

The power storage cell 12 of the present embodiment has a laminate pack shape in which the battery element is enclosed in a laminate film, but the power storage cell in the present disclosure is not limited to this, and the power storage cell may be a power storage cell in which the battery element is accommodated in a metal cell can. Further, the power storage cell 12 may accommodate the battery element together with an electrolytic solution, or may accommodate a battery element that is formed of an all-solid-state battery having no electrolytic solution.

The power storage cells 12 are arranged such that the positive electrode terminal 121A and the negative electrode terminal 121B are in a longitudinal direction (a D3 direction), are inserted from the opening 15a (or the opening 15b), and four power storage cells are stored in one cell storage space. Accordingly, in the frame body 11A, a total of twelve power storage cells 12 are distributed and stored in the three cell storage spaces 16, 17, and 16.

The positive electrode terminal 121A of the power storage cell 12 is arranged on the opening 15a of the openings 15a and 15b on both sides, and similarly, the negative electrode terminal 121B is arranged on a side of the opening 15a between the openings 15a and 15b on both sides. The positive electrode terminal 121A and the negative electrode terminal 121B of all the power storage cells 12 protrude from the opening 15a in a lateral direction of the frame body 11A. Accordingly, an electrical take-out direction of the power storage cells 12 is a D2 direction, which is different from a pressing direction (a D1 direction) of the power storage cell 12 with respect to a pressing member 18, as will be described later. Therefore, it is possible to reduce the size and weight of the frame body 11A, and workability of assembling the power storage module 10A is also improved. Further, since both the positive electrode terminal 121A and the negative electrode terminal 121B of the power storage cell 12 are arranged apart from a refrigerant inlet/outlet port of a temperature control device which will be described later, it is possible to inhibit short circuiting due to refrigerant leakage or the like.

In the present embodiment, the positive electrode terminal 121A and the negative electrode terminal 121B of adjacent power storage cells 12 and 12 are arranged to be opposite to each other in a height direction (a D3 direction) of the frame body 11A (FIG. 4). That is, in a case where the positive electrode terminal 121A of one power storage cell 12 is located in an upper side of the frame body 11A, the positive electrode terminal 121A of the other power storage cell 12 is located in a lower side of the frame body 11A. Therefore, in the plurality of power storage cells 12, the plurality of positive electrode terminals 121A and the plurality of negative electrode terminals 121B which protrude from the opening 15a on a side surface of the frame body 11A are alternately arranged in a width direction (a D1 direction) of the frame body 11A. One positive electrode terminal 121A and the other negative electrode terminal 121B between adjacent power storage cells 12 and 12 are electrically connected to each other by a bus bar (not shown), whereby all the power storage cells 12 in the frame body 11A are connected in series. Further, the positive electrode terminal 121A and the negative electrode terminal 121B of the power storage cells 12 and 12 arranged at both ends of the power storage module 10A in a width direction (a D1 direction) are electrically connected to external equipment by a harness (not shown).

In the present embodiment, all the power storage cells 12 in the frame body 11A are connected in series by the bus bar, but the present disclosure is not limited to this, and the positive electrode terminal 121A and the negative electrode terminal 121B of adjacent power storage cells 12 and 12 may be arranged to be aligned with each other in a height direction (a D3 direction). That is, in a case where the positive electrode terminal 121A of one power storage cell 12 is located in an upper side of the frame body 11A, the positive electrode terminal 121A of the other power storage cell 12 may also be located in an upper side of the frame body 11A. In this case, one positive electrode terminal 121A and the other positive electrode terminal 121A between adjacent power storage cells 12 and 12 are electrically connected to each other by a bus bar (not shown), and one negative electrode terminal 121B and the other negative electrode terminal 121B between adjacent power storage cells 12 and 12 are electrically connected to each other by another bus bar (not shown). Accordingly, all the power storage cells 12 in the frame body 11A are connected in parallel.

The power storage module 10A may have a pressing member 18 that is accommodated in the frame body 11A together with the plurality of power storage cells 12 (FIG. 4). The pressing member 18 is formed in a rectangular sheet shape similar to the power storage cell 12, and one pressing member is stored in each of the cell storage spaces 16, 17, and 16. The pressing member 18 is stored in each cell storage space by being inserted into the cell storage space 16 (or the cell storage space 17) through the opening 15a in a state of being stacked with the power storage cell 12. In the present embodiment, the pressing member 18 is interposed between the two central power storage cells 12 and 12 to partition the four power storage cells 12 in each cell storage space into two sets.

The pressing member 18 applies a pressing force toward the wall surface 13a of the bridging portion 13 or the wall surface 113a of the side plate portion 113 with respect to the four power storage cells 12 stored in the same cell storage space 16 (or the cell storage space 17) together with the pressing member 18 (FIGS. 5A and 5B). That is, the pressing member 18 presses two power storage cells 12 arranged on both sides thereof toward the wall surface 13a of the bridging portion 13 or the wall surface 113a of the side plate portion 113 which is arranged on a side opposite to the pressing member 18 by the predetermined pressing force. Accordingly, four power storage cells 12 in each cell storage space are held in each cell storage space without rattling. Further, the power storage cells 12 are uniformly pressed against the wall surface 13a of the bridging portion 13 and the wall surface 113a of the side plate portion 113 by the sheet-shaped pressing member 18, so that a contact thermal resistance between the power storage cells 12 and the wall surfaces 13a and 113a is also reduced, and temperature rise of the power storage cell 12 is inhibited.

Preferably, the specific pressing member 18 includes an elastic body or a swellable structure which is a member which is not particularly limited as long as it can be easily compressed and exert a pressing force sufficient to hold the power storage cells 12 in the cell storage spaces 16 and 17 without rattling, and it can be formed in a sheet shape. The pressing member 18 including an elastic body or a swellable structure can absorb an expansion force by being compressed when the power storage cell 12 in each cell storage space expands due to charging and discharging. Therefore, it is possible to reduce a load on the wall surface 13a of the bridging portion 13 or the wall surface 113a of the side plate portion 113 and a load on the frame body 11A when the power storage cell 12 expands. Further, the pressing load is canceled out when the power storage cell 12 expands, and strength and rigidity of the wall surface 13a of the bridging portion 13 or the wall surface 113a of the side plate portion 113 can be also set to be small, so that it is possible to reduce the weight and cost of the power storage modules 10A.

A foam of rubber or resin can be used for the elastic body. In a foam, by appropriately setting a forming ratio, it is possible to easily adjust a degree of absorption of the pressing force against the power storage cell 12 and the expansion force of the power storage cell 12. Further, by using a foam, it is possible to further reduce the weight and cost of the power storage modules 10A and 10B.

As the swellable structure, swellable resin or resin fiber aggregate that swells by being impregnated with a liquid can be used. As a specific example of the swellable resin, polyvinylidene fluoride (PVDF) or silicone resins may be exemplified. Further, as specific resin fiber aggregate, a stacked body of nonwoven fabrics of polyolefin resin fibers or phenol resin fibers may be exemplified. In the swelling structure, by appropriately adjusting a density, a type, a diameter, a length, and a shape of the resin or resin fiber, it is possible to easily adjust a degree of absorption of the pressing force against the power storage cell 12 and the expansion force of the power storage cell 12. Further, in a case where the swellable structure is used, it is possible to further reduce the weight and cost of the power storage modules 10A and 10B, similarly to for a foam.

The pressing member 18 may be stacked with the power storage cells 12 to be stored in the cell storage space 16 (or the cell storage space 17), and then may expand in a thickness direction (a D1 direction) of the pressing member 18 inside each cell storage space to press the power storage cell 12 against the wall surface 13a of the bridging portion 13 or the wall surface 113a of the side plate portion 113 and to hold the power storage cell. Accordingly, the power storage cells 12 in each cell storage space can be securely held without rattling. Since the pressing member 18 holds the power storage cell 12 without adhering to the power storage cell with an adhesive, disassembly is easy and recyclability is improved.

Further, since the pressing member 18 of the present embodiment is interposed between the two power storage cells 12 and 12, two parallel wall surfaces, for example, a wall surface 13a and a wall surface 13a, or a wall surface 13a and a wall surface 113a that separately define respective cell storage spaces can be each used as a heat transfer surface. Accordingly, it is possible to further suppress increase in temperature of the power storage cell 12.

When the pressing member 18 is stacked with the power storage cell 12 to be stored in the cell storage space 16 (or the cell storage space 17), the pressing member 18 may be stored in each cell storage space in a compressed state, and then the pressing member 18 may be expanded in each cell storage space by the restoring force from the compressed state. Accordingly, the power storage cell 12 can be easily inserted into each cell storage space, so that the power storage module 10A can be easily assembled.

The pressing member 18 may be coated with a resin film (not shown). That is, in a case where the pressing member 18 includes the elastic body, for example, the elastic body is enclosed in the resin film by coating the elastic body 40 with the resin film. As the resin film, a general soft resin film such as polypropylene can be used. In a case where the pressing member 18 includes the swellable structure, it is not necessary to cause the pressing member 18 to be impregnated with the liquid in each cell storage space, and the pressing member can be impregnated with the liquid in the resin film.

By using the pressing member 18 coated with the resin film in this way, the pressing member 18 can be used as an insulator. In particular, in a case where the power storage cell 12 uses a metal cell can, the pressing member 18 can be used instead of an insulating spacer, so that the number of insulating spacers can be reduced. Further, such a pressing member 18 can be also used as an insulator when electrically connecting adjacent power storage cells 12 and 12 adjacent to each other with the pressing member 18 interposed therebetween.

Further, in the power storage module 10A, a sheet-shaped temperature control device 19 may be attached to at least one of the upper portion and the lower portion of the frame body 11A (FIG. 4). In the present embodiment, for example, a water jacket as the temperature control device 19 is fixed to a wall surface 111b on an outer side of the bottom plate portion 111 in the frame body 11A (see FIG. 6). Further, in a case where the temperature control device 19 is provided in the power storage module 10A, a temperature measuring device that measures a temperature of the frame body 11A may be attached to any of the upper portion, the lower portion, and the side portion of the frame body 11A.

Since the frame body 11A is integrally formed of a metal material to improve heat transfer performance, the temperatures of the wall surfaces 13a and 113a in each cell storage space and the outer surface of the frame body 11A are made uniform. Therefore, it is easy to mount a temperature control component and a temperature measurement component, and it is possible to easily improve assembling properties and to easily reduce the cost.

The temperature control device 19 has a refrigerant inlet/outlet port 119 connected to an external refrigerant circuit at one end 19a in a length direction (a D2 direction) thereof. The refrigerant inlet/outlet port 119 of the temperature control device 19 is arranged on a side opposite to the electrode terminals 121 of the plurality of power storage cells 12.

The refrigerant inlet/outlet port 119 has an introduction portion 119A for introducing a refrigerant supplied from above into the temperature control device 19, and an exhaust portion 119B for exhausting the refrigerant in the temperature control device 19 upward. The introduction portion 119A of the refrigerant inlet/outlet port 119 is arranged on a side of the opening 15b between the openings 15a and 15b of the frame body 11A, and similarly, the exhaust portion 119B is arranged on a side of the opening 15b between the openings 15a and 15b on both sides. The introduction portion 119A and the exhaust portion 119B of the temperature control device 19 are located laterally with respect to the opening 15b and project upward.

In this way, since both the introduction portion 119A and the exhaust portion 119B of the temperature control device 19 are arranged on a side opposite to the positive electrode terminal 121A and the negative electrode terminal 121B in a length direction (a D1 direction) of the frame body 11A, assembling properties or removing work of the temperature control device 19 is improved. In addition, it is possible to inhibit short circuiting due to refrigerant leakage of the temperature control device 19.

Further, in a case where the plurality of power storage cells 12 are arranged in 2 rows and N columns (N is a natural number), the refrigerant inlet/outlet ports 119 of all the power storage cells 12 in a first row may be arranged on an inner side of the power storage module pack 1 in a width direction (a D2 direction) of the power storage module pack 1, and the refrigerant inlet/outlet ports 119 of all the power storage cells 12 in a second row may be also arranged on an inner side of the power storage module pack 1 in a width direction (a D2 direction) of the power storage module pack 1. In this case, the plurality of electrode terminals 121 in all the power storage cells 12 are arranged on a side outward from the power storage module pack 1 in a width direction (a D2 direction) of the power storage module pack 1. According to this configuration, in the power storage module pack 1, it is possible to lay a refrigerant circuit in a central portion in a width direction (a D2 direction) of the power storage module pack 1, and to lay an electric circuit in each of both ends in a width direction (a D2 direction) of the power storage module pack 1. Accordingly, it is possible to simplify circuit design and to achieve weight reduction and cost reduction while securing a distance between the electric circuit and the refrigerant circuit to inhibit electrical problems.

Alternatively, the refrigerant inlet/outlet ports 119 of all the power storage cells 12 in a first row may be arranged on a side outward from the power storage module pack 1 in a width direction (a D2 direction) of the power storage module pack 1, and the refrigerant inlet/outlet ports 119 of all the power storage cells 12 in a second row may be also arranged on a side outward from the power storage module pack 1 in a width direction (a D2 direction) of the power storage module pack 1. In this case, the plurality of electrode terminals 121 in all the power storage cells 12 are arranged on an inner side of the power storage module pack 1 in a width direction (a D2 direction) of the power storage module pack 1. Also with this configuration, it is possible to simplify circuit design and to achieve weight reduction and cost reduction while securing a distance between the electric circuit and the refrigerant circuit to inhibit electrical problems.

Figure 6A:
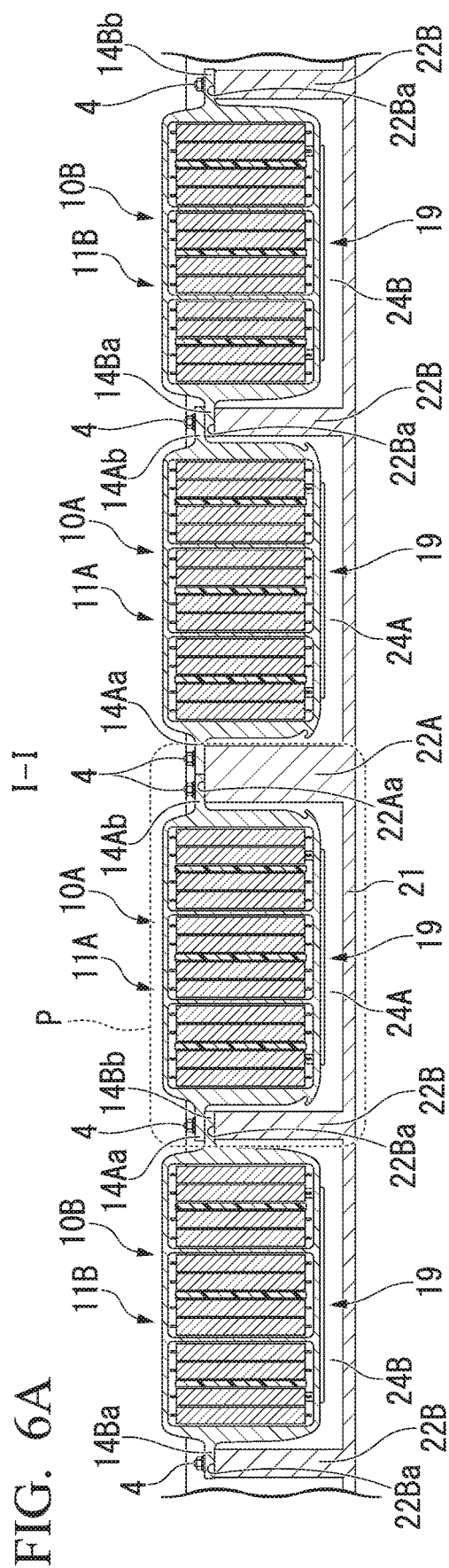
FIG. 6A is a cross-sectional view of the power storage module pack along line I-I of FIG. 1.
Figure 6B:
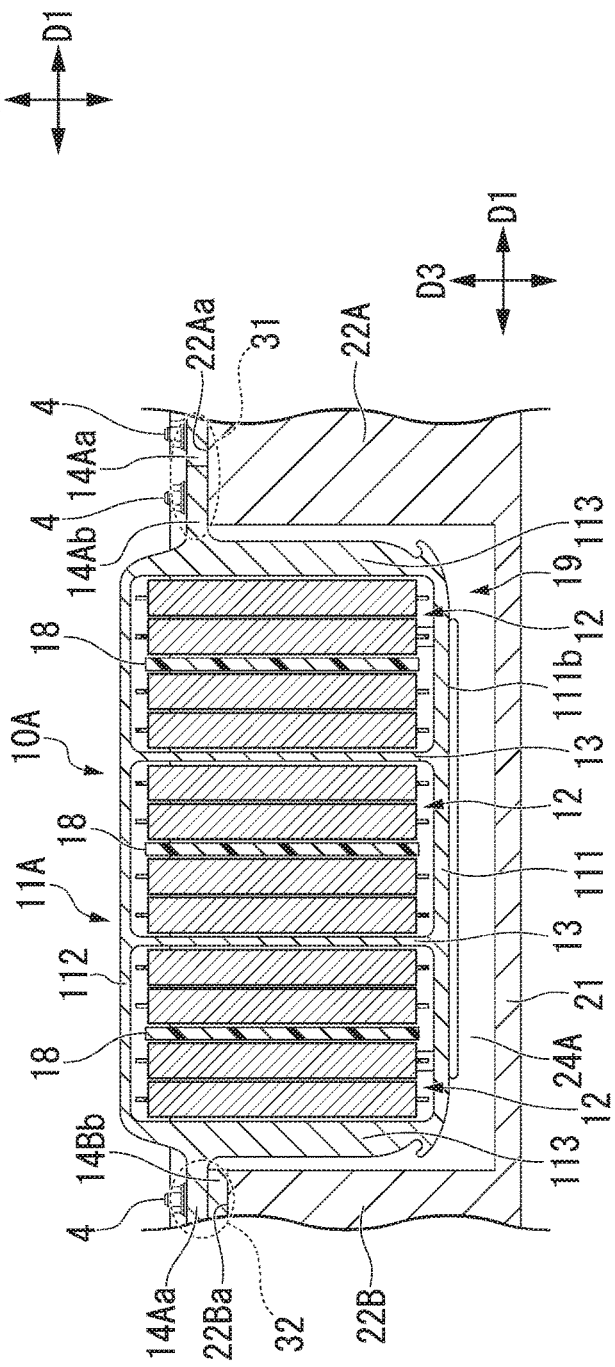
FIG. 6B is an enlarged partial cross-sectional view of a portion indicated by a broken line P.

FIG. 6A is a cross-sectional view of the power storage module pack 1 along line I-I of FIG. 1, and FIG. 6B is an enlarged partial cross-sectional view of a portion indicated by a broken line P.

As shown in FIG. 6A, in the power storage module 10A, the two flange portions 14Aa and 14Ab of the frame body 11A are each fixed to the upper end portions 22Aa and 22Ba of adjacent thick longitudinal wall portion 22A and thin longitudinal wall portion 22B. Further, in the power storage module 10B, the two flange portions 14Ba and 14Bb of the frame body 11B are each fixed to the upper end portions 22Ba and 22Ba of adjacent thin longitudinal wall portions 22B and 22B. The form of fixing the flange portions 14Aa, 14Ab, 14Ba, and 14Bb is not particularly limited, but for example, each flange portion is fixed to each first longitudinal wall portion via a bolt 4 with a washer. In this way, by employing a structure in which the flange portions 14Aa and 14Ab of the frame body 11A are fixed to the upper end portions 22Aa and 22Ba, and the two flange portions 14Ba and 14Bb of the frame body 11B are fixed to the upper end portions 22Ba and 22Ba, when assembling the plurality of power storage modules 10A and 10B in the box body 2, each power storage module can be easily fixed to the box body 2 from above the box body 2, and assembling properties of the power storage modules 10A and 10B are improved.

The upper end portion 22Aa of the thick longitudinal wall portion 22A has thereon a non-overlapping portion 31 at which the flange portion 14Ab provided in one of the two adjacent power storage modules 10A and 10A and the flange portion 14Aa provided in the other of the two power storage modules 10A and 10A do not overlap. In addition, the upper end portion 22Ba of the thin longitudinal wall portion 22B has thereon an overlapping portion 32 at which the flange portion 14Aa provided in one of the two adjacent power storage modules 10A and 10B and the flange portion 14Bb provided in the other of the two power storage modules 10A and 10B overlap. In the non-overlapping portion 31, the flange portions 14Ab and 14Aa are each fixed to the thick longitudinal wall portion 22A via bolts 4 and 4. On the other hand, in the overlapping portion 32, the flange portions 14Bb and 14Aa are fixed to the thin longitudinal wall portion 22B by being fastened together with one bolt 4. In this way, by providing the non-overlapping portion 31 on the upper end portion 22Aa of the thick longitudinal wall portion 22A, both the two power storage modules 10A and 10A can be firmly fixed to the thick longitudinal wall portion 22A. Further, by providing the overlapping portion 32 on the upper end portion 22Ba of the thin longitudinal wall portion 22B, a size of the power storage module pack 1 in a length direction (a D1 direction) can be reduced, and reduction in size and space saving in the power storage module pack 1 can be realized.

In this embodiment, a space portion 24A is provided between the frame body 11A of the power storage module 10A and the bottom wall portion 21 of the box body 2 (FIG. 6B). The space portion 24A is defined by the bottom wall portion 21 of the box body 2, the thick longitudinal wall portion 22A, the thin longitudinal wall portion 22B, and the frame body 11A of the power storage module 10A, for example. The space portion 24A is formed over the entire length of the frame body 11A in a length direction (a D2 direction) of the frame body 11A. The temperature control device 19 is arranged in the space portion 24A.

In addition, a space portion 24B is also provided between the frame body 11B of the power storage module 10B and the bottom wall portion 21 of the box body 2 (FIG. 6A). The space portion 24B is defined by the bottom wall portion 21 of the box body 2, the two thin longitudinal wall portions 22B and 22B, and the frame body 11B of the power storage module 10B, for example. The space portion 24B is formed over the entire length of the frame body 11B in a length direction (a D2 direction) of the frame body 11B.

In this way, the space portion 24A is provided between the frame body 11A of the power storage module 10A and the bottom wall portion 21 of the box body 2, and the space portion 24B is provided between the frame body 11B of the power storage module 10B and the bottom wall portion 21 of the box body 2, so that in a case where the bottom wall portion 21 of the power storage module pack 1 receives a shock, the shock is absorbed by the space portions 24A and 24B, and shock transmission to the power storage modules 10A and 10B is prevented or inhibited.

Further, the space portions 24A and 24B each constitute a heat insulating portion using air as a heat insulating material. Therefore, heat insulating properties between the power storage module pack 1 and the power storage modules 10A and 10B are improved, and thus it is possible to realize excellent cooling/heating of the power storage modules 10A and 10B using the temperature control device 19. Further, when the present disclosure is used in a cold region or the like, excessive cooling of the power storage modules 10A and 10B is inhibited, and thus it is easy to maintain the power storage modules 10A and 10B at an appropriate temperature.

As described above, according to the present embodiment, the two flange portions 14Aa and 14Ab provided in the frame body 11A are located above the central portion C1 of the frame body 11A in a height direction, and the two flange portions 14Ba and 14Bb provided in the frame body 11B are located above the central portion C2 of the frame body 11B in a height direction, so that it is possible to secure lengths of the first longitudinal wall portion 22 and the second longitudinal wall portion 23 of the power storage module pack 1 in a height direction (a D3 direction), and thus to improve rigidity of the power storage module pack 1 in a height direction. Further, since the bridging portions 13 are each provided inside the frame bodies 11A and 11B, rigidity of the frame bodies 11A and 11B in a height direction is improved, and thus it is possible to improve shock resistance against a shock from below the frame bodies 11A and 11B. Further, since the bridging portion 13 is in contact with or in pressure contact with the power storage cell 12, the wall surface 13a of the bridging portion 13 forms a heat transfer surface, and thus it is possible to improve a cooling efficiency of the power storage cell 12.

Further, since the box body 2 includes the first longitudinal wall portions 22 and 22 that extend from the bottom wall portion 21 and are provided side by side at intervals, and the second longitudinal wall portion 23 provided perpendicularly to the first longitudinal wall portions 22, it is possible to secure rigidity of the power storage module pack 1 in a length direction and a width direction. Further, since the two flange portions 14Aa and 14Ab of the frame body 11A are each fixed to the upper end portions 22Ba and 22Aa of adjacent thick longitudinal wall portion 22A and thin longitudinal wall portion 22B, and the two flange portions 14Ba and 14Bb of the frame body 11B are each fixed to the upper end portions 22Ba and 22Ba of adjacent thin longitudinal wall portions 22B and 22B, it is possible to secure sizes of the first longitudinal wall portion 22 and the second longitudinal wall portion 23 in a height direction (a D3 direction) without increasing a size of the power storage module pack 1 in a height direction. Accordingly, it is possible to improve the rigidity of the power storage module pack 1 in the height direction, and further, to improve assembling properties of the power storage modules 10A and 10B with respect to the box body 2.

Therefore, it is possible to improve assembling properties of the power storage modules 10A and 10B while securing sufficient rigidity and on-vehicle installation capability of the power storage modules 10A and 10B and the power storage module pack 1, and further, to improve shock resistance against a shock from below the power storage modules 10A and 10B and the power storage module pack 1.

Figure 7A:
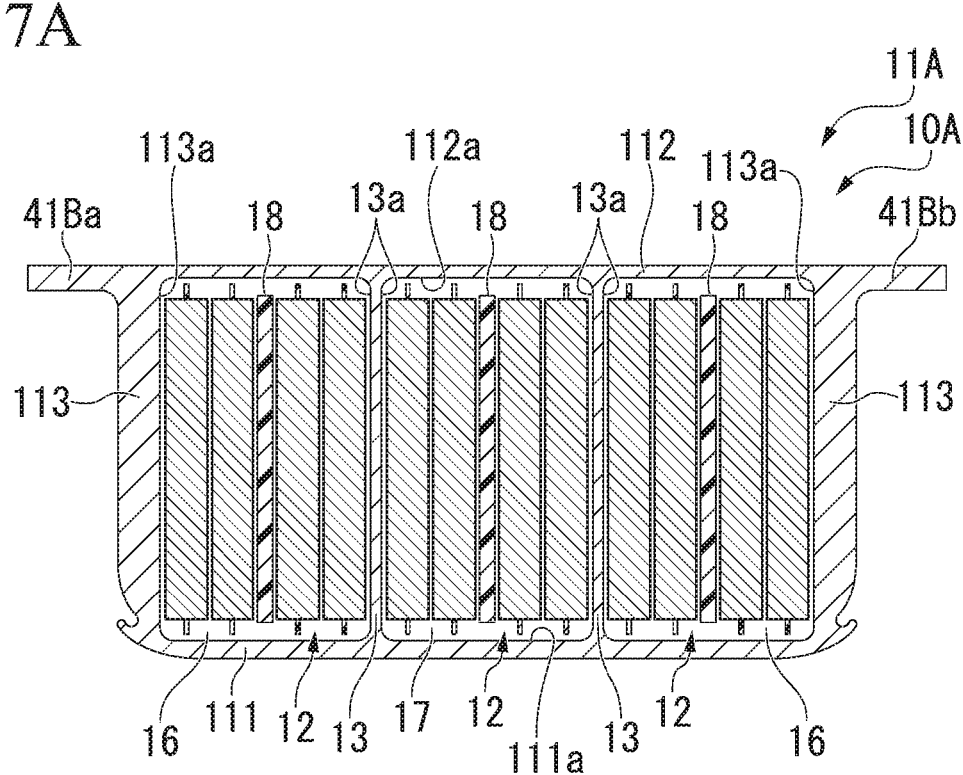
FIG. 7A is a cross-sectional view showing a modification example of two flange portions in FIG. 5A.
Figure 7B:
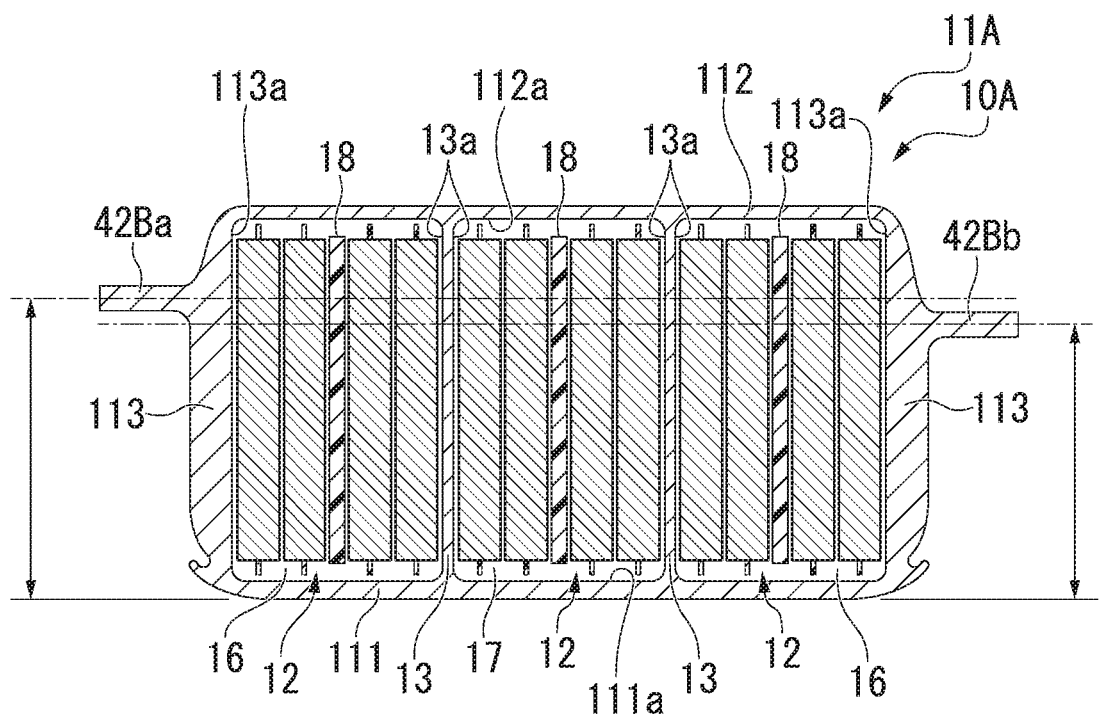
FIG. 7B is a cross-sectional view showing another modification example.

FIG. 7A is a cross-sectional view showing a modification example of the two flange portions 14Aa and 14Ab in FIG. 5A, and FIG. 7B is a cross-sectional view showing another modification example.

As shown in FIG. 7A, two flange portions 41Aa and 41Ab may be located at the same height as the top plate portion 112 of the frame body 11A. Accordingly, the power storage module 10A can be arranged without protruding from an upper surface of the box body 2, a height of the power storage module pack 1 can be reduced, and a space portion between the power storage module 10A and the lid body 3 can be easily provided.

Further, as shown in FIG. 7B, heights of two flange portions 42Aa and 42Ab may be different. In this case, the two flange portions of the power storage module 10B can have the same configuration as the two flange portions 42Aa and 42Ab of the power storage module 10A. Accordingly, it is possible to realize simplification and cost reduction of a manufacturing process.

Figure 8A:
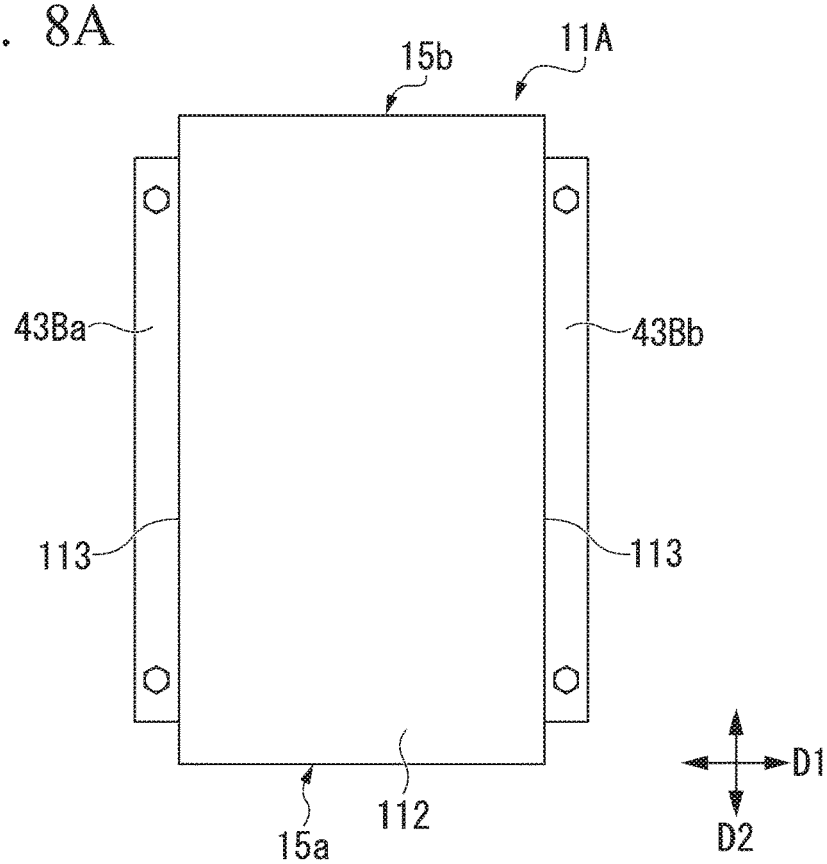
FIGS. 8A and 8B are plan views showing another modification example of two flange portions in FIG. 5A.
Figure 8B:
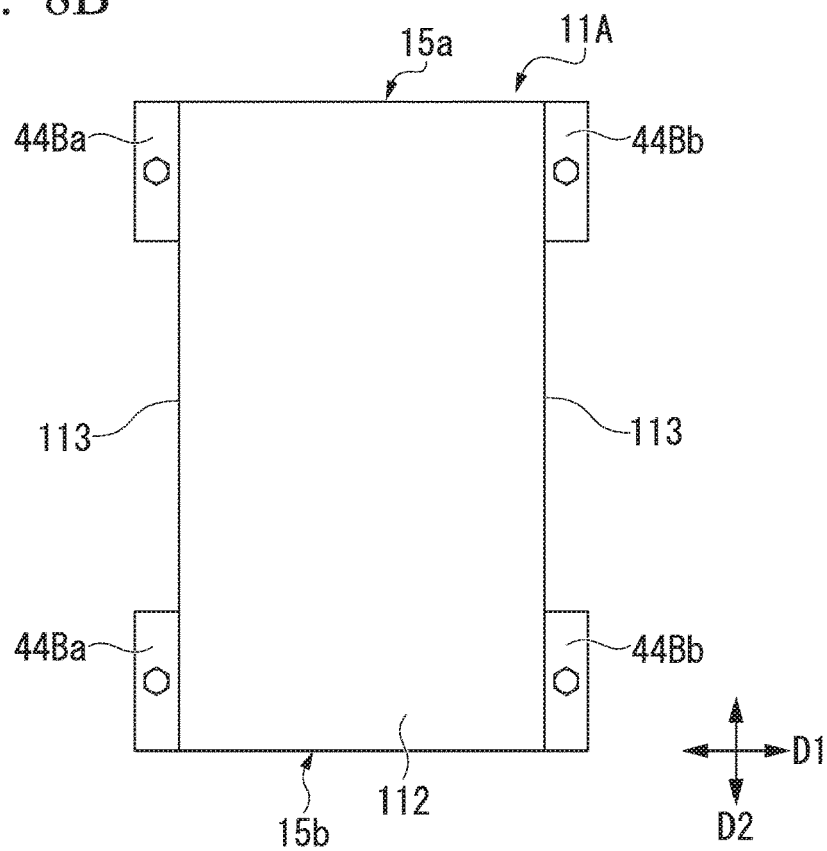

FIGS. 8A and 8B are plan views showing another modification example of the two flange portions 14Aa and 14Ab in FIG. 5A.

In the above-described embodiment, the two flange portions 14Aa and 14Ab extend over approximately the entire side plate portion 113 in a length direction (a D2 direction), but the present disclosure is not limited to this, and as shown in FIG. 8A, two flange portions 43Aa and 43Ab may extend in a part of the side plate portion 113 in a length direction (a D2 direction) of the side plate portion 113. Further, as shown in FIG. 8B, the flange portion 44Aa may extend intermittently in a length direction (a D2 direction) of the side plate portion 113, and the flange portion 44Ab may extend intermittently in a length direction (a D2 direction) of the side plate portion 113. Accordingly, it possible to reduce the weight of the power storage modules 10A and 10B and the power storage module pack 1.

Figure 9A:
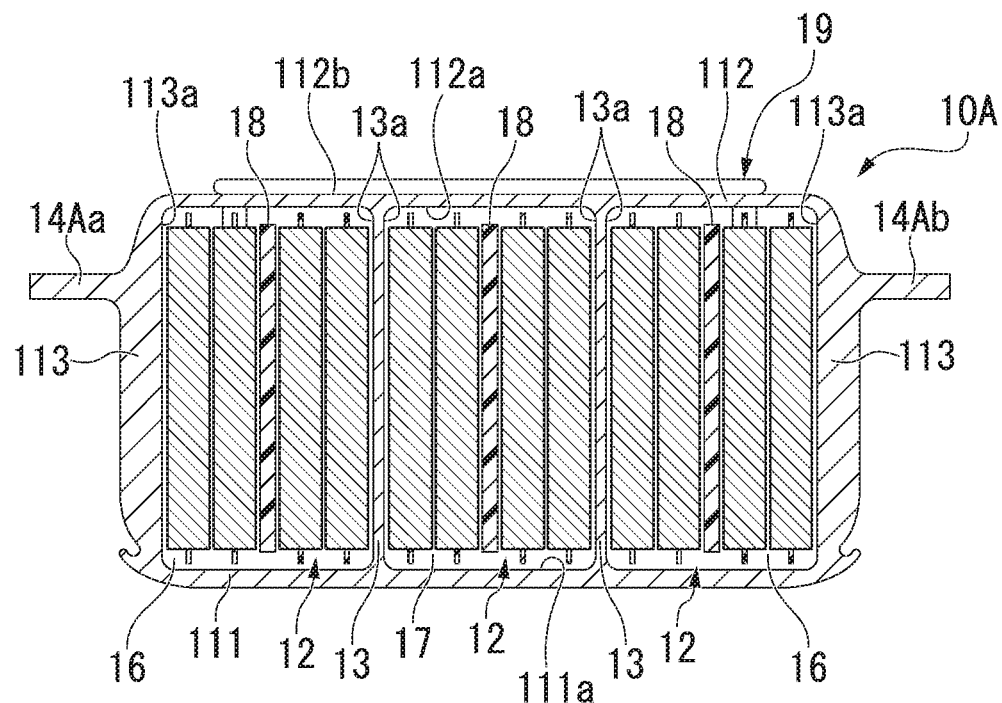
FIG. 9A is a cross-sectional view showing a modification example of the power storage module pack of FIG. 1.
Figure 9B:
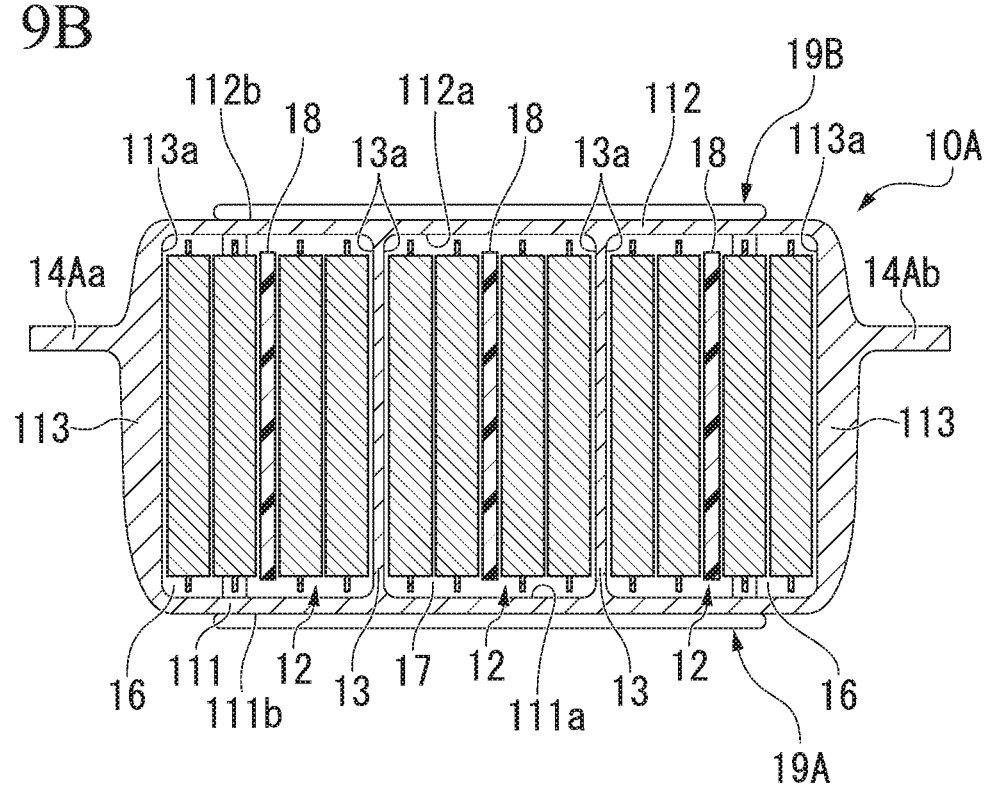
FIG. 9B is a cross-sectional view showing another modification example of the power storage module pack of FIG. 1.

FIG. 9A is a cross-sectional view showing a modification example of the power storage module pack 1 of FIG. 1, and FIG. 9B is a cross-sectional view showing another modification example of the power storage module pack 1 of FIG. 1.

In the above embodiment, the temperature control device 19 is fixed to the wall surface 111b on an outer side of the bottom plate portion 111 in the frame body 11A, but the present disclosure is not limited to this, and as shown in FIG. 9A, the temperature control device 19 may be fixed to a wall surface 112b on an upper side of the top plate portion 112 in the frame body 11A. Accordingly, even in a case where a shock is received from below the power storage module pack 1, it is possible to prevent the temperature control device 19 from being deformed or damaged, and to further improve shock resistance.

As shown in FIG. 9B, a temperature control device 19A may be fixed to the wall surface 111b on an outer side of the bottom plate portion 111 in the frame body 11A, and a temperature control device 19B may be fixed to the wall surface 112b on an outer side of the top plate portion 112. Further, in a case where the temperature control devices 19A and 19B are provided in the power storage module 10A, two temperature measuring devices that measure a temperature of the frame body 11A may be attached to two among the upper portion, the lower portion, and the side portion of the frame body 11A. Accordingly, it is possible to realize superior cooling/heating of the power storage module 10A using the temperature control devices 19A and 19B. Further, it is also possible to realize superior cooling/heating of the power storage module 10B using the temperature control devices 19A and 19B.

Figure 10:
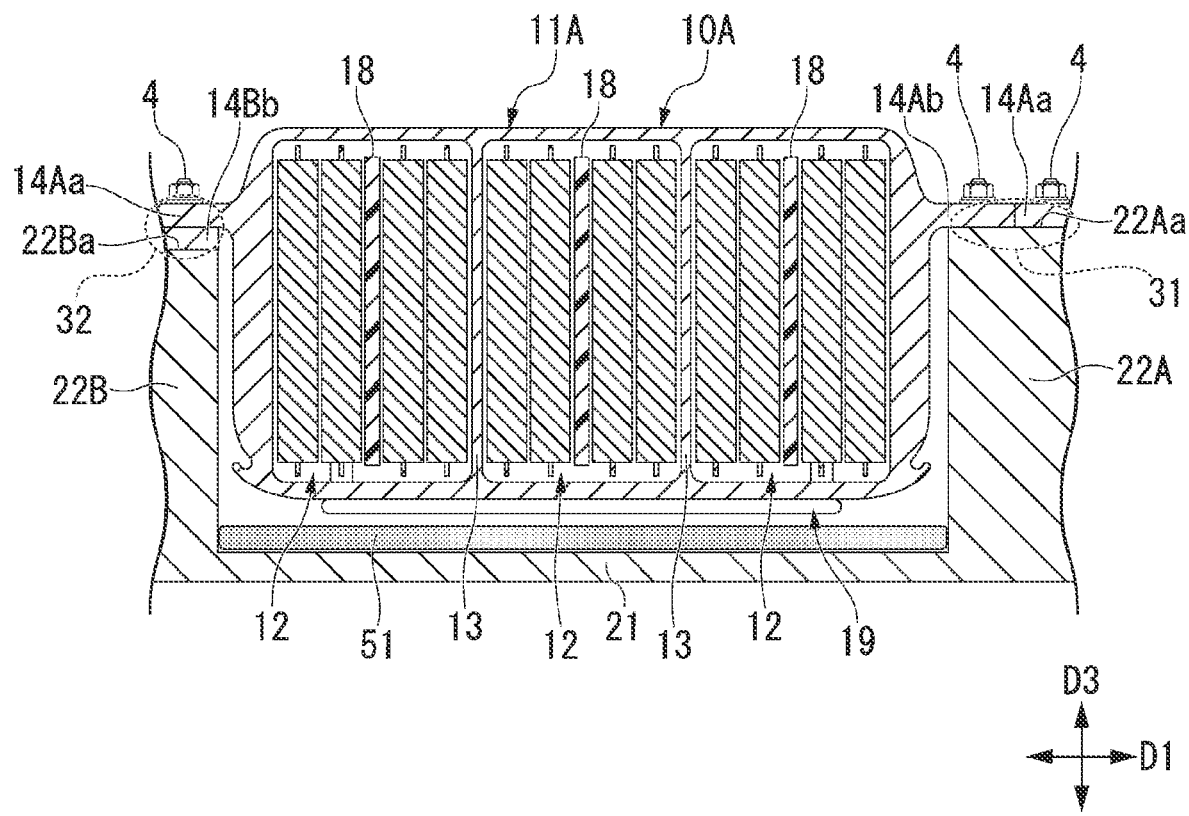
FIG. 10 is a cross-sectional view showing a modification example of the power storage module pack of FIG. 6B.

FIG. 10 is a cross-sectional view showing a modification example of the power storage module pack 1 of FIG. 6A.

As shown in FIG. 10, a heat insulating member 51 may be arranged in the space portion 24A of the power storage module pack 1. The heat insulating member 51 is flat in a D3 direction and is arranged, for example, between the bottom wall portion 21 of the power storage module pack 1 and the temperature control device 19. In addition, the heat insulating member 51 may be arranged over the entire power storage module 10A in a width direction (a D1 direction) and may be arranged over the entire power storage module 10A in a length direction (a D2 direction). A material forming the heat insulating member 51 is not particularly limited as long as it can insulate from heat between the bottom wall portion 21 of the power storage module pack 1 and the temperature control device 19, and is, for example, a nonwoven fabric, preferably a microfiber nonwoven fabric.

Further, the heat insulating member 51 may function as a cushioning member interposed between the bottom wall portion 21 of the power storage module pack 1 and the temperature control device 19. In this case, the heat insulating member 51 is made of, for example, foamed plastic. By configuring the heat insulating member 51 as a cushioning member, it is possible to further improve shock resistance against a shock from below the power storage module pack 1 while improving the heat resistance.

Figure 11A:
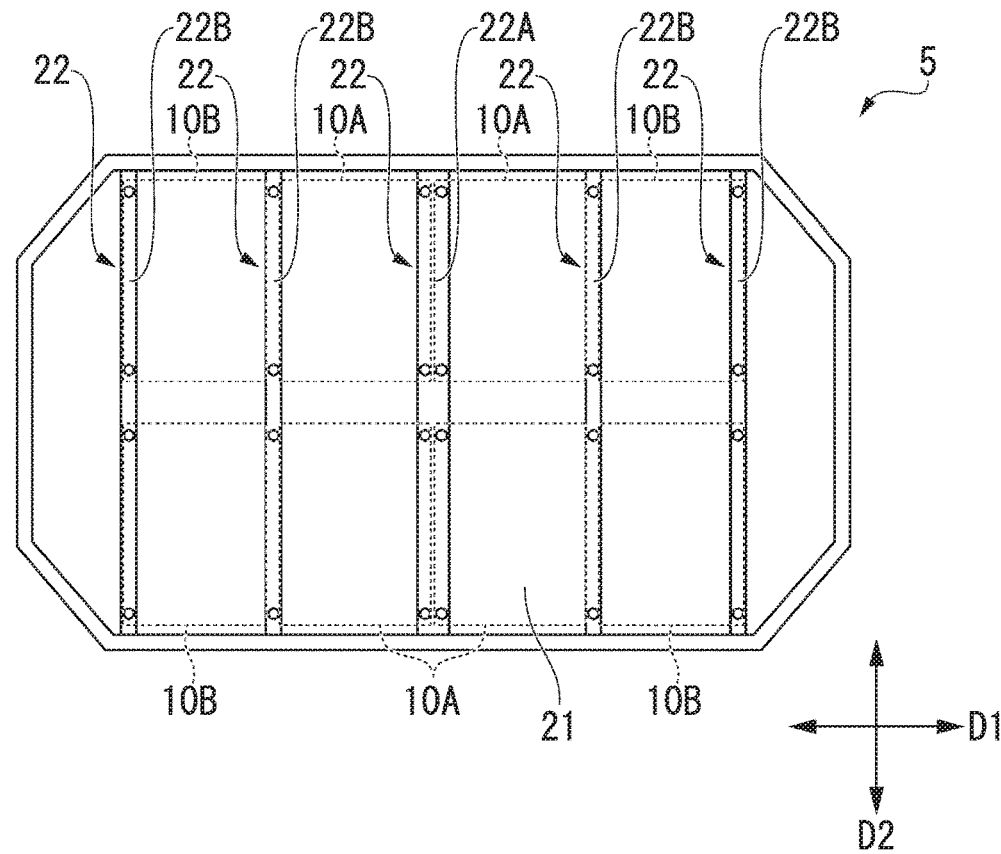
FIGS. 11A and 11B are plan views showing other modification examples of the box body in FIG. 2A.
Figure 11B:
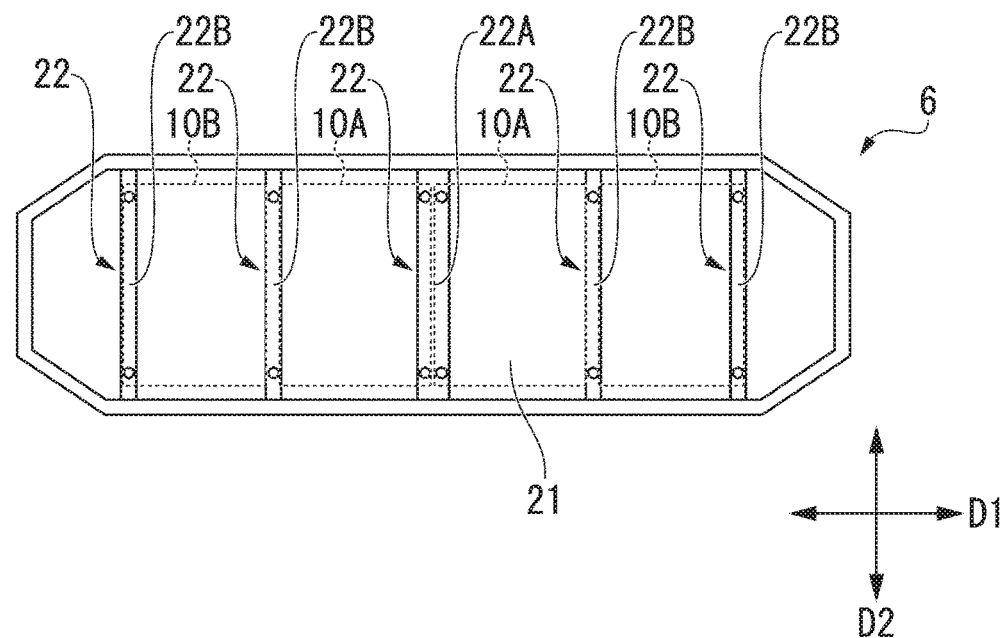
Figure 12:
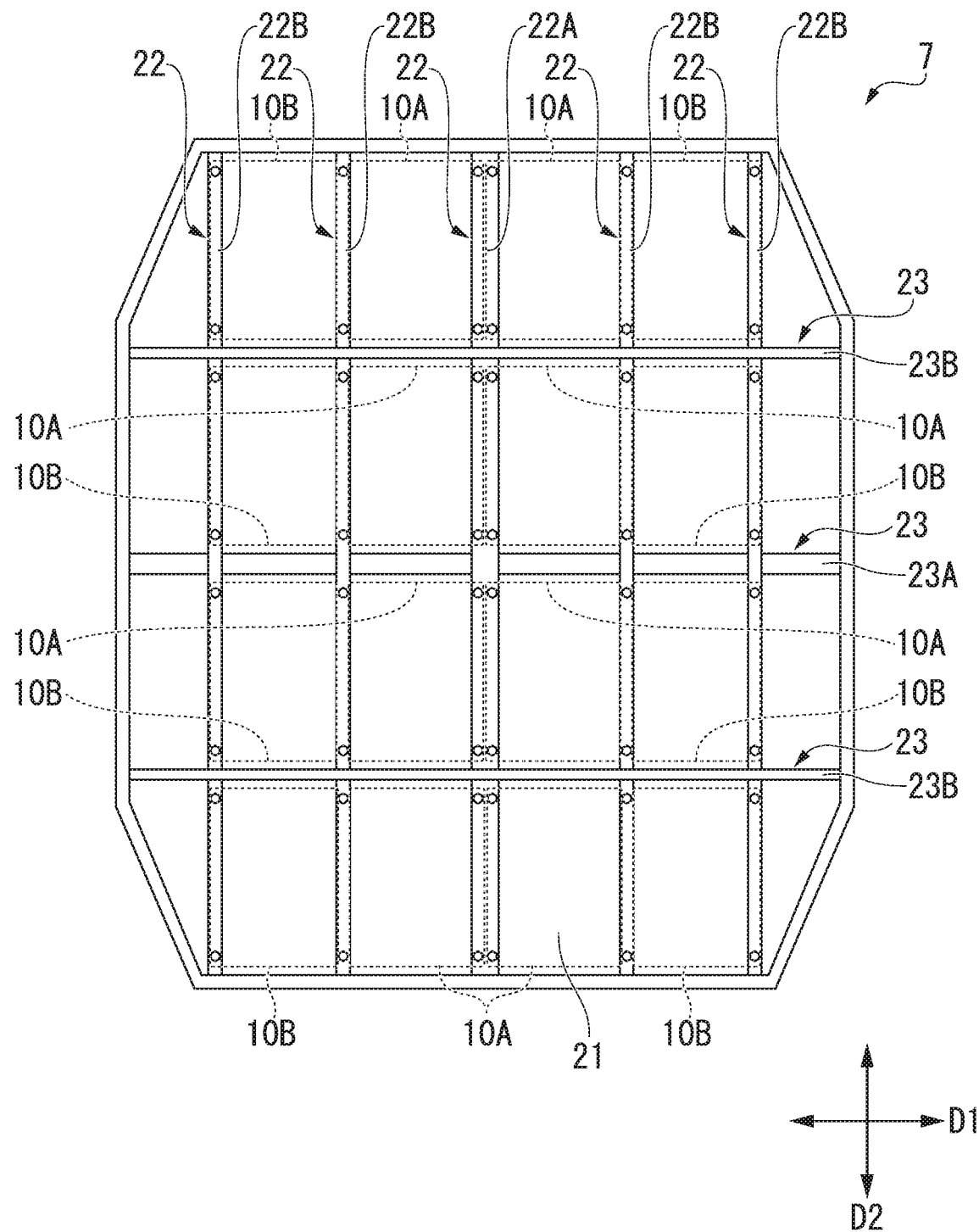
FIG. 12 is a plan view showing another modification example of the box body in FIG. 2A.

FIGS. 11A and 11B are plan views showing other modification examples of the box body 2 in FIG. 2A, and FIG. 12 is a plan view showing another modification example of the box body 2 in FIG. 2A.

In the above-described embodiment, the box body 2 has the plurality of first longitudinal wall portions 22 and the second longitudinal wall portions 23, but the present disclosure is not limited to this, and in a case where it is possible to secure sufficient rigidity by the bottom wall portion 21 and the plurality of first longitudinal wall portions 22, the second longitudinal wall portion 23 may not be provided. That is, as shown in FIG. 11A, a box body 5 includes the bottom wall portion 21, and the plurality of first longitudinal wall portions 22 that extend from the bottom wall portion 21 and are provided side by side at intervals, and may not include the second longitudinal wall portion. Accordingly, it is possible to reduce the weight of the box body 5 while improving shock resistance against a shock from below the power storage module pack 1.

Further, in the above-described embodiment, the plurality of power storage modules 10A and 10B are arranged in a matrix shape (2 rows and 4 columns) in the box body 2, but the present disclosure is not limited to this, and the plurality of power storage modules 10A and 10B may be arranged in 1 row and 4 columns That is, as shown in FIG. 11B, in a box body 6, the plurality of power storage modules 10A and 10B may be arranged only in a length direction (a D1 direction). Accordingly, it is possible to reduce a space for the box body 6 while improving shock resistance against a shock from below the power storage module pack 1.

Furthermore, the plurality of power storage modules 10A and 10B may be arranged in X rows and Y columns (X and Y are natural numbers of 1 or more). For example, as shown in FIG. 12, a plurality of power storage modules 10A and 10B may be arranged in a box body 7 in 4 rows and 4 columns.

As shown in FIG. 12, the box body 7 includes the bottom wall portion 21, the plurality of first longitudinal wall portions 22 that extend from the bottom wall portion 21 and are provided side by side at intervals, and the plurality of second longitudinal wall portions 23 provided perpendicularly to the plurality of first longitudinal wall portions 22 and side by side at intervals. The plurality of second longitudinal wall portions 23 include, for example, a thick longitudinal wall portion 23A arranged in a central portion of the box body 7 in a length direction (a D2 direction) in a plan view, and a thin longitudinal wall portion 23B arranged adjacent to the thick longitudinal wall portion 23A. The plurality of second longitudinal wall portions 23 may include a plurality of second longitudinal wall portions having the same thickness.

According to this configuration, the plurality of first longitudinal wall portions 22 and the plurality of second longitudinal wall portions 23 form a parallel crosses structure, and thus it is possible to further improve shock resistance against a shock from below the power storage module pack 1. Further, it is possible to increase the number of the power storage modules with which one power storage module pack is equipped, and thus to increase a capacity of the power storage module pack 1.

While preferred embodiments of the invention have been described and illustrated above, it should be understood that these are exemplary of the invention and are not to be considered as limiting. Additions, omissions, substitutions, and other modifications can be made without departing from the spirit or scope of the present disclosure. Accordingly, the invention is not to be considered as being limited by the foregoing description, and is only limited by the scope of the appended claims.

What is claimed is:

1. A power storage module pack comprising:
a plurality of power storage modules; and
a box body that accommodates the plurality of power storage modules,
wherein the power storage module includes
a frame body,
a plurality of power storage cells accommodated in the frame body,
a bridging portion that is provided inside the frame body and connects an upper portion and a lower portion of the frame body to each other, and
two flange portions that are provided outside the frame body and project in directions opposite to each other,
wherein the two flange portions are located above a central portion of the frame body in a height direction,
wherein the box body includes
a bottom wall portion, and
a plurality of first longitudinal wall portions that extend from the bottom wall portion and are provided side by side at intervals, and
wherein the two flange portions of the frame body are each fixed to upper end portions of two adjacent first longitudinal wall portions, and wherein the plurality of first longitudinal wall portions include a thick longitudinal wall portion arranged in a central portion of the box body in a plan view, and a thin longitudinal wall portion arranged adjacent to the thick longitudinal wall portion.

2. The power storage module pack according to claim 1, wherein a space portion is provided between the frame body of the power storage module and the bottom wall portion of the box body.

3. The power storage module pack according to claim 2, wherein a heat insulating member is arranged in the space portion.

4. The power storage module pack according to claim 3, wherein a sheet-shaped temperature control device is attached to at least one of the upper portion and the lower portion of the frame body of the power storage module.

5. The power storage module pack according to claim 2, wherein a sheet-shaped temperature control device is attached to at least one of the upper portion and the lower portion of the frame body of the power storage module.

6. The power storage module pack according to claim 1, wherein a sheet-shaped temperature control device is attached to at least one of the upper portion and the lower portion of the frame body of the power storage module.

7. The power storage module pack according to claim 6, wherein a refrigerant inlet/outlet port of the temperature control device is arranged on a side opposite to electrode terminals of the plurality of power storage cells.

8. The power storage module pack according to claim 1,
wherein an upper end portion of the thick longitudinal wall portion has thereon a non-overlapping portion at which the flange portion provided in one of the two adjacent power storage modules and the flange portion provided in the other of the two power storage modules do not overlap, and
wherein an upper end portion of the thin longitudinal wall portion has thereon an overlapping portion at which the flange portion provided in one of the two adjacent power storage modules and the flange portion provided in the other of the two power storage modules overlap.

9. The power storage module pack according to claim 1, wherein the box body further includes at least one second longitudinal wall portion provided perpendicularly to the plurality of first longitudinal wall portions.

10. The power storage module pack according to claim 1, further comprising:
   a lid body detachably provided to cover an upper portion of the box body.

* * * * *